United States Patent
Lyubashevsky et al.

(10) Patent No.: US 9,973,342 B2
(45) Date of Patent: May 15, 2018

(54) AUTHENTICATION VIA GROUP SIGNATURES

(71) Applicant: International Business Machines Corporation, Armonk, NY (US)

(72) Inventors: Vadim Lyubashevsky, Zug (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/184,221

(22) Filed: Jun. 16, 2016

(65) Prior Publication Data

US 2017/0366358 A1    Dec. 21, 2017

(51) Int. Cl.
  *H04L 9/32*    (2006.01)
  *H04L 9/30*    (2006.01)
  *H04L 29/06*   (2006.01)

(52) U.S. Cl.
  CPC .......... *H04L 9/3255* (2013.01); *H04L 9/3093* (2013.01); *H04L 9/3221* (2013.01); *H04L 63/0414* (2013.01); *H04L 63/0435* (2013.01)

(58) Field of Classification Search
  CPC ..................................................... H04L 9/3255
  See application file for complete search history.

(56) References Cited

U.S. PATENT DOCUMENTS 5,299,263 A * 3/1994 Beller ................ G06Q 20/3674
                                                340/5.74
5,406,628 A * 4/1995 Beller ................ G06Q 20/3674
                                                380/270

(Continued)

FOREIGN PATENT DOCUMENTS

WO    2015030553 A1    3/2015

OTHER PUBLICATIONS

Calandriello et al.; Efficient and robust pseudonymous authentication in VANET; Published in: Proceeding VANET '07 Proceedings of the fourth ACM international workshop on Vehicular ad hoc networks; pp. 19-28; Montreal, Quebec, Canada —Sep. 10-10, 2007; ACM Digital Library (Year: 2007).*

(Continued)

*Primary Examiner* — Bradley Holder
(74) *Attorney, Agent, or Firm* — Harrington & Smith

(57) ABSTRACT

Methods and systems are provided for authenticating a message $\mu$, at a user computer of a group signature scheme, to a verifier computer. The method includes, at the user computer, storing a user id m for the user computer and a user signing key which comprises a signature on the user id m under a secret key of a selectively-secure signature scheme. The user id m is an element of a predetermined subring, isomorphic to $\mathbb{Z}_q[x]/(g(x))$, of a ring $R=\mathbb{Z}_q[x]/(f(x))$, where $f(x)$ and $g(x)$ are polynomials of degree $\deg(f)$ and $\deg(g)$ respectively such that $\deg(f) > \deg(g) > 1$. The method includes, at the user computer, generating a first cryptographic proof $\Pi_1$ comprising a zero-knowledge proof of knowledge of the user signing key and including the message $\mu$ in this proof of knowledge. The user computer sends the message $\mu$ and a group signature, comprising the first proof $\Pi_1$, to the verifier computer.

18 Claims, 4 Drawing Sheets

(56) References Cited

U.S. PATENT DOCUMENTS

| | | | | |
|---|---|---|---|---|
| 8,121,290 | B2* | 2/2012 | Teranishi | H04L 9/3218 380/259 |
| 8,904,183 | B2* | 12/2014 | Bellur | H04L 63/1458 713/170 |
| 8,966,273 | B2* | 2/2015 | Hwang | H04L 9/3255 177/180 |
| 9,106,644 | B2* | 8/2015 | McCusker | H04L 63/083 |
| 9,698,985 | B2* | 7/2017 | McCusker | H04L 9/3073 |
| 2007/0248226 | A1* | 10/2007 | Chong | H04N 21/2383 380/200 |
| 2011/0238997 | A1* | 9/2011 | Bellur | H04L 63/1458 713/176 |
| 2012/0166808 | A1 | 6/2012 | Hong et al. | |
| 2013/0091360 | A1* | 4/2013 | Hwang | H04L 9/3255 713/176 |
| 2015/0063564 | A1 | 3/2015 | Joye et al. | |

OTHER PUBLICATIONS

Sun et al.; An Efficient Pseudonymous Authentication Scheme With Strong Privacy Preservation for Vehicular Communications; Published in: IEEE Transactions on Vehicular Technology (vol. 59, Issue: 7, Sep. 2010); pp. 3589-3603; Date of Publication: Jun. 7, 2010; IEEE Xplore (Year: 2010).*

Agrawal, Shweta, et al., "Efficient Lattice (H)IBE in the Standard Model", EUROCRYPT 2010, 20 pgs.

Bellare, Mihir, et al., "Multi-Signatures in the Plain Public-Key Model and a General Forking Lemma", ACM Conference on Computer and Communications Securitym 2006, 10 pgs.

Boyen, Xavier, "Lattice Mixing and Vanishing Trapdoors: A Framework for Fully Secure Short Signatures and More", Public Key Cryptography, 2010, 19 pgs.

Brakerski, Zvika, et al., "Classical Hardness of Learning with Errors", Symposium on Theory of Computing Conference, STOC'13, Palo Alto, CA, USA, 2013, 22 pgs.

Gentry, Craig, et al., "How to Use a Short Basis: Trapdoors for Hard Lattices and New Cryptographic Constructions", STOC, 2008, 41 pgs.

Laguillaumie, Fabian, et al., "Lattice-Based Group Signatures with Logarithmic Signature Size", Advances in Cryptology—ASIACRYPT 2013, vol. 8270, 25 pgs.

Ling, San, et al., "Group Signatures from Lattices: Simpler, Tighter, Shorter, Ring-based", PKC 2015, 26 pgs.

Lyubashevsky, Vadim, "Lattice Signatures Without Trapdoors", EUROCRYPT 2012, 24 pgs.

Lyubashevsky, Vadim, et al., "On Ideal Lattices and Learning with Errors Over Rings", ACM, 60(6) 2013, 34 pgs.

Lyubashevsky, Vadim, et al, "A Toolkit for Ring-LWE Cryptography", EUROCRYPT 2013, 51 pgs.

Micciancio, Daniele, et al., "Trapdoors for Lattices: Simpler, Tighter, Faster, Smaller", EUROCRYPT 2012, 41 pgs.

Nguyen, Phong Q., et al., "Simplier Efficient Group Signatures from Lattices", PKC 2015, 26 pgs.

Pointcheval, David, et al., "Security Arguments for Digital Signatures and Blind Signatures", Cryptology 13(3), 2000, 36 pgs.

* cited by examiner

AUTHENTICATION VIA GROUP SIGNATURES

RELATED APPLICATIONS

This application is related to US patent application no. {Applicant's file reference CH9-2016-0020US2} filed concurrently herewith.

BACKGROUND

The present invention relates generally to authentication via group signatures, and more particularly to authentication of messages sent by user computers of a group signature scheme to verifier computers.

Group signature schemes are cryptographic protocols which enable computers using such a group scheme to authenticate their messages on behalf of a group. In a group signature scheme, a group manager supplies distinct secret keys to all user computers in the group. The user computers can then sign messages anonymously in name of the group. A verifier computer, which receives a signed message, can verify that the message was signed by a member of the group, but cannot determine which user was the actual signer. The scheme provides for an additional entity, the "opener", which is the only entity able to recover the identity of the signer. The opener may be the group manager or other designated authority which is trusted to "open" signatures and extract user identities when necessary, e.g. in the case of system abuse. Group signatures are particularly useful in scenarios where remote devices need to be authenticated but privacy requires that individual devices can only be identified by a designated authority. Examples include: government-issued electronic identity (eID) cards, where each issued smart card creates identity claims as signed statements about its attributes, without needing to fully identify its owner; remote anonymous attestation of computing platforms, where devices prove which software they execute; or vehicle-to-vehicle (V2V) communication, where vehicles inform each other about their position, speed, observed conditions, etc., via short-range radio communication.

Group signature schemes using lattice-based cryptography have received a lot of attention. Early lattice-based group signature schemes had signature sizes that were linear in the number of group members, and were therefore mainly proofs of concept and unsuitable for practical application. Later schemes were asymptotically more efficient with signature sizes logarithmic in the number of users. However, practical instantiations of lattice-based group signature schemes remain a challenge.

SUMMARY

According to at least one embodiment of the present invention there is provided a method for authenticating a message p, at a user computer of a group signature scheme, to a verifier computer. The method includes, at the user computer, storing a user id m for the user computer and a user signing key which comprises a signature on the user id m under a secret key of a selectively-secure signature scheme. The user id m is an element of a predetermined subring, isomorphic to $\mathbb{Z}_q[x]/(g(x))$, of a ring $R=\mathbb{Z}_q[x]/(f(x))$, where $f(x)$ and $g(x)$ are polynomials of degree $\deg(f)$ and $\deg(g)$ respectively such that $\deg(f)>\deg(g)>1$. The method includes, at the user computer, generating a first cryptographic proof $\Pi_1$ comprising a zero-knowledge proof of knowledge of the user signing key and including the message $\mu$ in this proof of knowledge. The user computer sends the message $\mu$ and a group signature, comprising the first proof $\Pi_1$, to the verifier computer.

At least one further embodiment of the invention provides a computer program product comprising a computer readable storage medium embodying program instructions, executable by a user computer of a group signature scheme, to cause the user computer to perform the foregoing method. At least one additional embodiment of the invention provides a system for authenticating a message $\mu$. The system comprises a user computer of a group signature scheme and a verifier computer, wherein the user computer is adapted to perform the foregoing method and the verifier computer is adapted to authenticate the message $\mu$ by verifying the first proof $\Pi_1$ using a public key of the selectively-secure signature scheme.

Embodiments of the invention will be described in more detail below, by way of illustrative and non-limiting example, with reference to the accompanying drawings.

DETAILED DESCRIPTION

Figure 1:
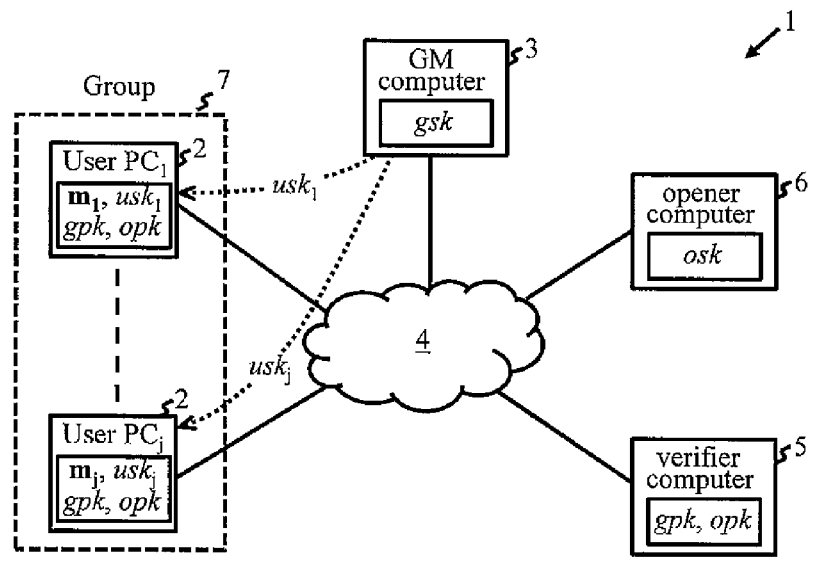
FIG. 1 is a schematic illustration of a computer system in which authentication methods embodying the invention may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, Segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic block diagram of an exemplary computer system 1 for implementing authentication methods embodying the invention. The system 1 includes a group of j user computers, in this example general-purpose user PCs (personal computers) 2, which are members of a group signature (GS) scheme. The GS scheme is controlled by a group manager (GM), represented here by GM computer 3. The user PCs 2 can communicate with each other, and with other computers, via a network 4, where network 4 may in general comprise one or more component networks and/or internetworks, including the Internet, and may include wired and/or wireless network links. In particular, user PCs 2 can send messages $\mu$, signed in the name of the group as described below, to other computers. A computer receiving a message $\mu$, represented here by verifier computer 5, can verify authenticity of the message without learning the identity of the sender. In general, verifier computer 5 may be another user computer 2 or a computer outside the group. The system 1 may therefore include one or more verifier computers to which user computers 2 must authenticate their messages in operation of the GS scheme. The GS scheme also provides an opener entity, represented here by opener computer 6, which can open group signatures when necessary. In general, the opener entity may be implemented by GM computer 3 or another computer operated by a trusted authority for the scheme.

Each computer 2, 3, 5 and 6 of system 1 provides functionality for implementing respective tasks of the GS scheme. In particular, user PCs 2 provide functionality for generating group signatures authenticating their messages $\mu$. Each verifier computer 5 (which may include user computers 2), provides functionality for verifying group signatures to authenticate signed messages μ. GM computer 3, provides functionality for generating user secret keys as described below. Opener computer 6 provides functionality for opening groups signatures to reveal the identity of the sender computer 2. The circumstances and manner in which group signatures are supplied to opener computer 6 for opening will depend on the application scenario. Typically, however, in cases of system abuse, e.g. by a corrupted user PC 2 or other adversarial intervention, group signatures can be supplied to opener computer 6 for opening. In the present example, verifier computer 5 can send signatures to opener computer 6 via network 4 when required.

As indicated schematically in FIG. 1, each computer 2, 3, 5 and 6 stores data required for operation of the GS scheme in memory operatively associated with that computer. Each user PC 2 stores a user identity (id) m discussed further below. (The different user PCs, and their respective different identities m and signing keys usk, are distinguished by suffixes 1 to j in FIG. 1). Each user computer 2 also stores a group public key gpk for the GM scheme and a public key opk of an encryption scheme discussed below. GM computer 3 stores a group secret key gsk for the GS scheme which is used to generate user signing keys usk as described below. Verifier computer 5 stores the public keys gpk and opk. Opener computer 6 stores a secret key (the decryption key) osk of the encryption scheme. Each computer 2, 3, 5 and 6 typically also stores other data, such as security parameters for cryptographic protocols, any additional communication keys, etc., which may be used in operation of the system.

Functionality of computers 2, 3, 5 and 6 for operation of the GS scheme may be implemented by logic embodied in hardware or software or a combination thereof.

Figure 2:
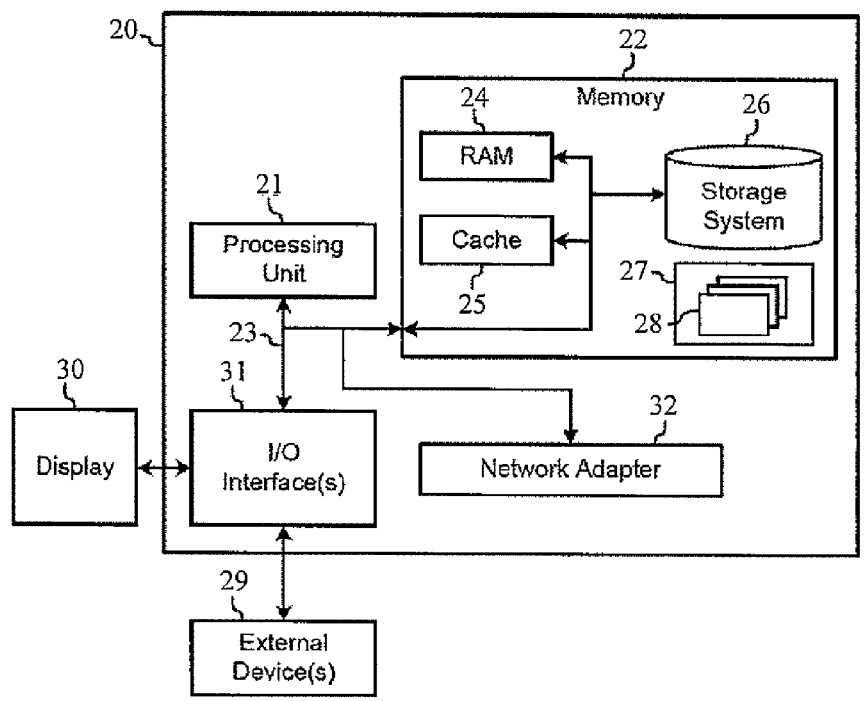
FIG. 2 is a generalized schematic of a computer in the FIG. 1 system.

Such logic may be described in the general context of computer system-executable instructions, such as program modules, executed by a computing apparatus. Generally, program modules may include routines, programs, objects, components, logic, data structures, and so on that perform particular tasks or implement particular abstract data types. FIG. 2 is a block diagram of exemplary computing apparatus for implementing a computer of system 1. The computing apparatus is shown in the form of a general-purpose computer 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 19 and/or cache memory 25. Computer 20 may further include other removable/non-removable, volatile/non-volatile computer system storage media. By way of example only, storage system 26 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 23 may include at least one program product having one or more program modules that are configured to carry out functions of embodiments of the invention. By way of example, program/utility 27, having a set (at least one) of program modules 28, may be stored in memory 22, as well as an operating system, one or more application programs, other program modules, and program data. Each of the operating system, one or more application programs, other program modules, and program data, or some combination thereof, may include an implementation of a networking environment. Program modules 28 generally carry out the functions and/or methodologies of embodiments of the invention as described herein.

Computer 20 may also communicate with: one or more external devices 29 such as a keyboard, a pointing device, a display 30, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32. As depicted, network adapter 32 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

Figure 3:
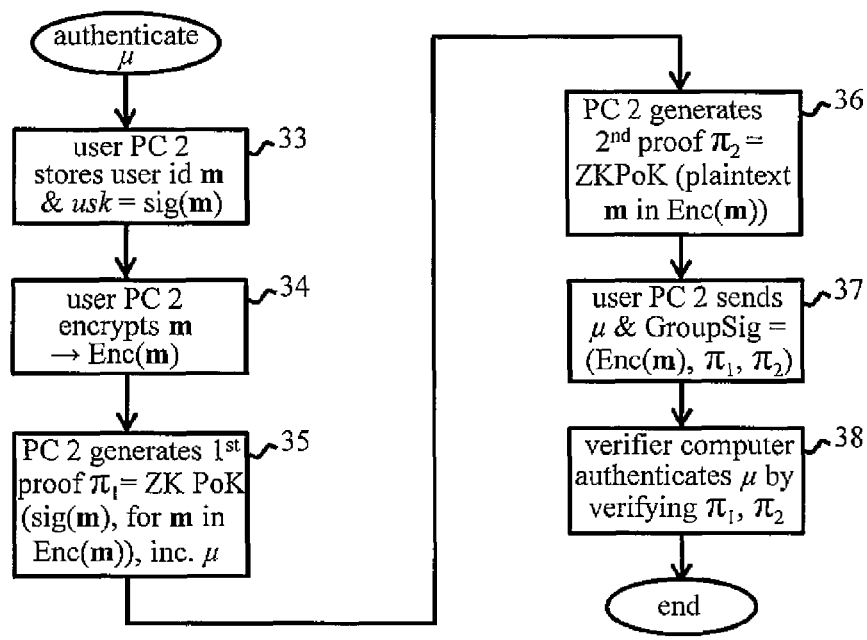
FIG. 3 indicates steps of an authentication method in operation of the FIG. 1 system.

The embodiments to be described implement a lattice-based group signature scheme. FIG. 3 indicates steps performed in one embodiment of the scheme to authenticate a message μ sent by a user computer 2 to a verifier computer 4. Such a message μ may comprise any data generated by, or otherwise provided at, the user computer for communication to the verifier computer. To generate a group signature for a message, each user PC 2 stores its user id m and user signing key usk as represented by step 30 of FIG. 3. The user id m and signing key usk are generated by the group manager and may be pre-stored at user PC 2 or supplied to PC 2 in any convenient manner, e.g. by GM computer 3 via communication over network 4. The user signing key usk comprises a signature "sig(m)" on the user id m under the group secret key gsk of the scheme. In the embodiments below, this group secret key gsk is a secret key of a selectively-secure signature scheme, and hence the group public key gpk is a public key of the selectively-secure signature scheme. (A signature scheme is said to be selectively secure if an adversary needs to declare the message (in this case the user id m) upon which he will forge before seeing the public key of the scheme). In addition, the user id m of each group member 2 is an element of a predetermined subring, isomorphic to $\mathbb{Z}_q[x]/(g(x))$, of a ring $R=\mathbb{Z}_q[x]/(f(x))$, where $f(x)$ and $g(x)$ are polynomials of degree $\deg(f)$ and $\deg(g)$ respectively such that $\deg(f) > \deg(g) \geq 1$. The elements of this ring R are thus polynomials in the indeterminate variable x which have coefficients in $\mathbb{Z}_q$ (the set of integers modulo (mod) q) where q is a predetermined prime number.

In step 31 of FIG. 3, the user PC 2 encrypts its user id m, via a predetermined encryption scheme "Enc", to produce a ciphertext Enc(m). This encryption is performed using the public key opk of the encryption scheme Enc. In step 32, user PC 2 generates a first cryptographic proof $\Pi_1$. This proof $\Pi_1$ comprises a zero-knowledge proof of knowledge (ZK PoK) of the user signing key usk=sig(m), in which the user id m is the same as that encrypted in the ciphertext Enc(m), and includes the message μ in the proof of knowledge. (In cryptography, a zero-knowledge (ZK) proof is a proof which reveals no more than that which is required to be proved). In the embodiments below, the proof $\Pi_1$ is a non-interactive (NI) proof, i.e. a proof the generation of which does not require interaction with a verifier). The first proof $\Pi_1$ is generated as detailed below using, inter alia, the public keys gpk and opk.

In step 33, user PC 2 generates a second cryptographic proof $\Pi_2$. This proof $\Pi_2$ comprises a zero-knowledge proof of plaintext knowledge of the user id m encrypted in the ciphertext Enc(m). This proof is generated as detailed below using, inter alia, the public key opk, and is again a NIZK PoK in the embodiments to be described. In step 34, user PC 2 sends the message μ, and a group signature ("GroupSig") on the message, to verifier computer 4. This group signature comprises the ciphertext Enc(m), the first proof $\Pi_1$ and the second proof 112. In response to receipt of this communication, verifier computer 4 authenticates the message μ by verifying the first proof $\Pi_1$, using the public key gpk of the selectively-secure signature scheme, and verifying the second proof $\Pi_2$ using the public key opk of the encryption scheme Enc.

The above method provides secure and efficient group signature schemes. By constraining the domain of user ids m to the predetermined subring of R, the message m that a selective adversary would declare for the selectively-secure signature scheme can be guessed from this subring. The efficiency advantage inherent to selectively-secure signature schemes can thus be exploited while achieving enhanced security of a secure signature scheme.

Figure 4:
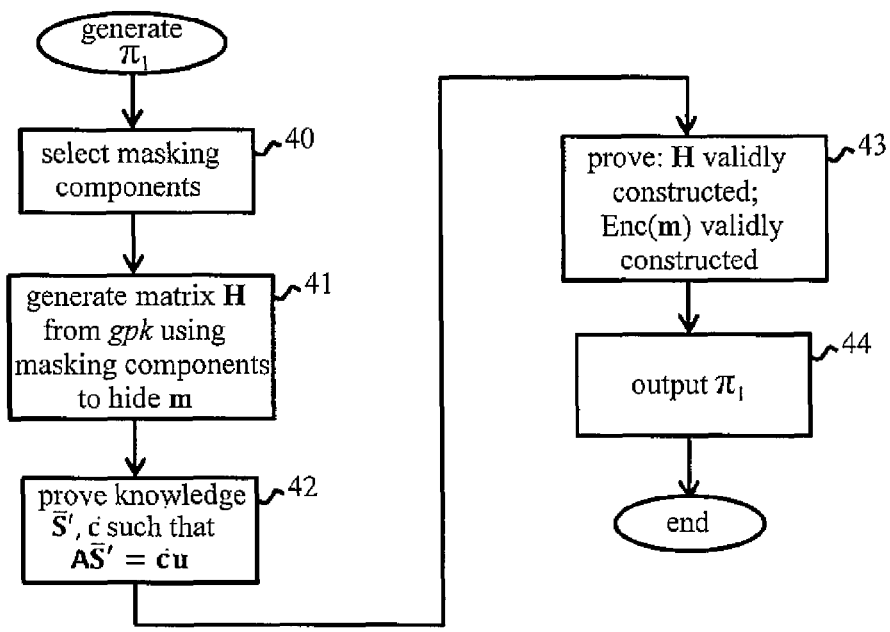
FIG. 4 indicates steps for generating a first cryptographic proof in an embodiment of the authentication method.

FIG. 4 indicates more detailed steps in generating the first proof $\Pi_1$ in a preferred embodiment. In this embodiment, the proof $\Pi_1$ is based on a proof of knowledge of linear relations. This proof is described in reference [Lyu12] (all references are listed at the end of this description) and will be explained in detail below. Briefly here, for a matrix A of elements of a ring and a vector U of elements of the ring for which there exists a vector S such that AS=U, it is possible to produce a proof of knowledge of a vector $\bar{S}$ and an element $\bar{c}$ such that $A\bar{S}=U\bar{c}$. In the present embodiment, the user signing key usk=sig(m) comprises a vector S of elements of the ring R. However, as explained below, one cannot naively apply the [Lyu12] proof here as this would reveal the user id m. Hence, in step 40 of FIG. 4, user PC 2 selects a set of (one or more) masking components comprising elements of the ring R. These masking components (which comprise an element d of the ring R and a vector E of elements of the ring R in a detailed implementation below) will be used in generating the first proof $\Pi_1$ to hide the user id m in this proof. In step 41, user PC 2 generates a matrix H using the masking components (to hide m in this matrix) and components of the public key gpk such that A'S'=U holds, where the matrix A' includes H and components of gpk, and the vector S' is dependent on the user signing key S. In step 42, user PC 2 then generates a NIZK PoK knowledge of a vector $\bar{S}'$ (dependent on S' and hence the user signing key S), and an element $\bar{c}$, dependent on the message μ, of the ring R such that $A\bar{S}'=U\bar{c}$. This procedure, explained further below, allows the [Lyu12] proof to be used for an efficient proof $\Pi_1$ which does not reveal the user id m.

In step 43, user PC 2 generates a NIZK proof which proves that (a) the vector H is validly constructed from the public key gpk; and (b) that the ciphertext Enc(m) is validly constructed for the encryption scheme Enc. As explained in more detail below, this step uses an efficient commitment linking the two proofs $\Pi_1$ and $\Pi_2$, allowing the first proof $\Pi_1$ to be made "in one go". In step 44, the resulting first proof $\Pi_1$, comprising the proofs of steps 42 and 43, is output and the FIG. 4 process is complete.

Figure 5:
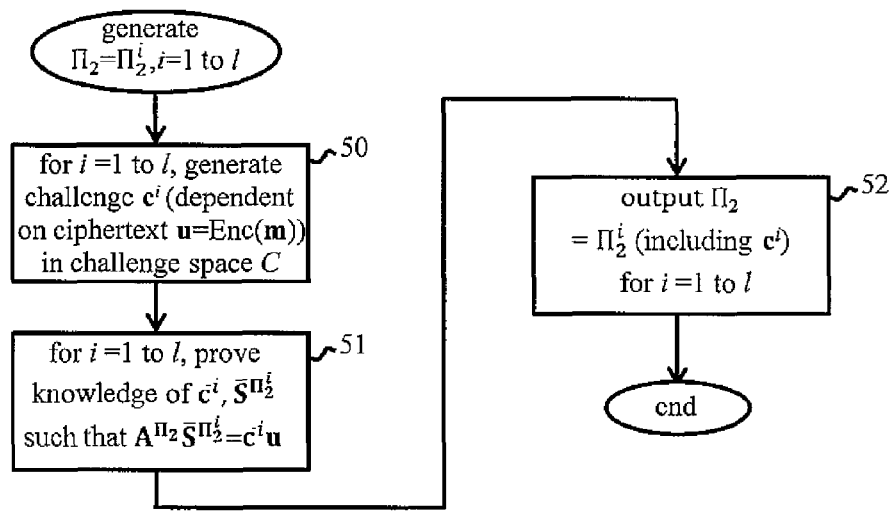
FIG. 5 indicates steps for generating a second cryptographic proof in an embodiment of the authentication method.

FIG. 5 indicates more detailed steps in generating the second proof $\Pi_2$ in a preferred embodiment. In this embodiment, the encryption scheme applies a linear function (denoted here by $A^{\Pi_2}$), dependent on the public key opk, to a function $S^{\Pi_2}$ which is dependent on the user id m and randomness which can be provided here by a set of (one or more) random elements of the ring R. The second proof fl, in this embodiment comprises a plurality l of sub-proofs $\Pi_2{}^i$, i=1 to l, each comprising a zero-knowledge proof of plaintext knowledge of the user id m in the ciphertext Enc(m). In step 50 of FIG. 5, for each sub-proof $\Pi_2{}^i$, user PC 2 generates a challenge $c^i$ for that sub-proof. Each challenge $c^i$ is dependent on the ciphertext Enc(m) which is denoted here by u. The challenges $c^i$ are constrained to a predetermined challenge space C. In the detailed implementation below, this is achieved by selecting the challenges $c^i$ as elements of the ring R which have "small coefficients", i.e. coefficients of less than a predetermined magnitude. Since the domain of user ids m is already constrained to a predetermined subring of R, these challenges are conveniently also selected from this subring.

In step 51, for each sub-proof $\Pi_2{}^i$, user PC 2 generates a NIZK proof of knowledge of an element $\bar{c}^i$ and a function $\bar{S}^{\Pi_2'}$, dependent on the element $\bar{c}^i$, such that $A^{\Pi_2}\bar{S}^{\Pi_2'}=\bar{c}^i u$. Here, $\bar{c}^i=\gamma(c^i, c^{i'})$ for an element $c^{i'}$ which is constrained to the challenge space C, where γ is a predetermined function. (In an implementation below, $\gamma(c^i, c^{i'})=(c^i-c^{i'})$ where $c^{i'}$ is an element of the predetermined subring of ring R, and $\bar{S}^{\Pi_2'}/\bar{c}^i=S^{\Pi_2}$). The resulting sub-proofs $\Pi_2{}^i$, i=1 to l, each of which includes the challenge $c^i$ from step 50 and the NIZK PoK from step 51, constitute the second proof $\Pi_2$ which is output in step 52, and the process is complete.

The above process allows the [Lyu12] proof of knowledge to be used for an efficient proof 112 while ensuring that the opener can always extract the user id m from the proof, even in the case of an adversarially-created ciphertext u=Enc(m) which is not itself decryptable. In particular, constraining each challenge $c^i$ and each element $c^{i'}$ above to the predetermined challenge space C permits identification, by searching the challenge space C, of an element $c^{i''}$ such that $\gamma(c^i, c^{i''})u$ decrypts to $\gamma(c^i, c^{i''})m$ using the decryption key osk of the encryption scheme Enc, thereby revealing m. The element $c^{i''}$ here may or may not be equal to $c^{i'}$ (there may be more than one $c^{i''}$ that works) but each valid $c^{i''}$ in $\gamma(c^i, c^{i''})u$ gives a decryption revealing the same user id m. This will be explained in more detail below.

Figure 6:
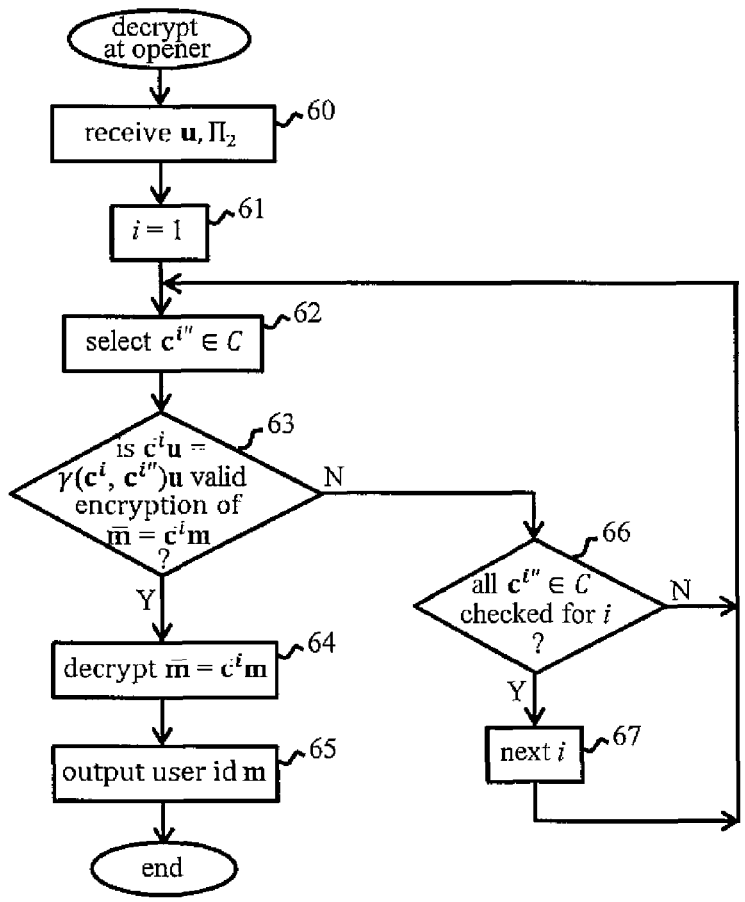
FIG. 6 indicates steps performed by an opener in the FIG. 1 system.

FIG. 6 indicates steps performed by opener computer 6 to reveal the identity m of a user PC 2 which generated a group signature. In step 60, opener computer 6 receives the ciphertext u=Enc(m) and the/sub-proofs $\Pi_2{}^i$ (each including the challenge $c^i$) of the second proof $\Pi_2$ in the group signature.

In step 61, the variable i is set to 1 for the first sub-proof. In step 62, opener computer 6 makes a first selection for $c^{i''}$ from elements in the predetermined challenge space C. In step 63, the opener computer tests whether $\bar{c}^i u = \gamma(c^i, c^{i''})u$ is a valid encryption of $\bar{m} = \bar{c}^i m$. This test is explained in more detail below. If so ("Y" (yes) at decision block 63), then $\bar{m} = \gamma(c^i, c^{i''})m$ is decrypted in step 64 using the decryption key ask. In step 65, the user id m is extracted as $= \bar{m}/\gamma(c^i, c^{i''})$ using the selected $c^{i''}$ and the challenge $c^i$ from the current sub-proof.

Returning to step 63, if $\gamma(c^i, c^{i''})u$ is not a valid encryption of $\bar{m}$ for the currently-selected $c^{i''}$, ("N" (no) at decision 63), then operation proceeds to step 66 which checks whether all $c^{i''}$ in the challenge space C have been tried for the current sub-proof. If not, operation reverts to step 62 where the next element $c^{i''}$ is selected from C. (Successive elements $c^{i''}$ can simply be selected in order from the challenge space C). This element $c^{i''}$ is then tested as before. If it is decided at step 66 that all elements in C have been tested, then i is incremented in step 67 and operation reverts to step 62 for the next sub-proof Operation thus continues, searching the challenge space C for a valid $c^{i''}$, until the user identity m is output in step 65.

A detailed implementation is given below for an exemplary embodiment of the group signature scheme. Some preliminary issues are described first.

There are two major efficiency obstacles to implementing a group signature scheme via lattice constructions. The first is that it seems difficult to give a practical NIZK PoK of the plaintext for lattice-based encryption. The second inefficiency involves giving a NIZK PoK of the knowledge of the user signing key sig(m). In the following we address both inefficiencies. For the NIZK proof of plaintext knowledge of Enc(m), we describe a scheme that only needs to be repeated three times for practical parameters. Then, for proving knowledge of sig(m), we show how to combine the selectively secure signature scheme from [ABB10, Boy10] with the NIZK PoK from [Lyu12] to be able to use a challenge space which is arbitrarily large, and thus be able to do the proof "in one go". Thus we completely eliminate the need for the inherently inefficient Stem and "single-bit-challenge" version of the proof in [Lyu12]. We instantiate our scheme with concrete parameters and obtain signature sizes of approximately 0.77 Megabytes. Because of the reduced number of repetitions required in the NIZK, we estimate that our scheme is about 2 orders of magnitude more efficient than [NZZ15] and even more than that when compared to [LLLS13, LNW15]. Our group signature introduces an efficient trick to hide the identity that is doing the signing while still being able to prove the knowledge of the secret key associated with the identity. The efficiency of the group signature to be described uses algebraic properties of polynomial rings of the form $\mathbb{Z}_q[x]/(x^n+1)$ that involve their subring structure and using a modulus q such that all elements in the ring with small coefficients have an inverse.

Proof of Plaintext Knowledge

Our first contribution is the construction of an encryption scheme that has a more efficient proof of plaintext knowledge. Consider the CPA-secure Ring-LWE encryption scheme [LPR13a, LPR13b] over the ring $\mathbb{Z}_q[x]/(x^n+1)$ where the public key is (a, $t=as_1+s_2$) (where $s_1$ and $s_2$ are elements in R with small coefficients and a is uniformly random in R), the decryption key is $s_1$, and the encryption of m is ($v=p(ar+e_1)$, $w=p(tr+e_2)+m$) (where r, e, and m have small coefficients, and p is a prime larger than the size of the coefficients of m). What is needed for the group signature is a proof of knowledge such that the decryption of the ciphertext (v, w) will give the same result as the extraction of the message from Π. For convenience, we will denote by A and S the matrices $$A = \begin{bmatrix} pa|p|0|0 \\ pt|0|p|1 \end{bmatrix},$$

and $S = [r|e_1|e_2|m]$ in $R^4$. The encryption of m is therefore:

$$\begin{bmatrix} v \\ w \end{bmatrix} = \begin{bmatrix} pa|p|0|0 \\ pt|0|p|1 \end{bmatrix} \begin{bmatrix} r \\ e_1 \\ e_2 \\ m \end{bmatrix} \quad (1)$$

If the decryptor Possesses the secret key $s_1$, then he can uniquely recover m from S as long as the elements in S are small enough (see below for details).

A proof of plaintext knowledge using the NIZK PoK from [Lyu12] has the following general structure. A prover who knows a vector S such that $A \cdot S = U$ can perform the following proof of knowledge. The prover picks a "masking" vector Y (with small coefficients) and sends $W = A \cdot Y$ to the verifier. The verifier sends a challenge polynomial c, and the prover computes $Z = Sc + Y$. (To make this proof honest verifier zero-knowledge, the prover does some rejection sampling, but this is not pertinent to the discussion here). It suffices to understand that if S, Y and c only have small coefficients, then so does Z. Then the verification algorithm can check that Z has small coefficients and that $A \cdot Z = cU + W$. This protocol is a proof of knowledge because if the prover is rewound to just after he sent W, and the verifier sends a different c' and receives a Z' with small coefficients such that $A \cdot Z' = c'U + W$, he can combine the two equations and get $A \cdot (Z - Z') = (c - c')U$. Note that because $(Z - Z')/(c - c')$ does not necessarily have small coefficients, this is not a proof that there exists an S with small coefficients such that $A \cdot \bar{S} = U$. Thus U is not necessarily a valid ciphertext and the decryption of U could result in garbage.

Below we introduce our approach for reducing the soundness error. Note that even though there does not necessarily exist an $\bar{S}$ with small coefficients such that $A \cdot \bar{S} = U$, the proof of knowledge does imply the existence of $\bar{S}$, $\bar{c}$ with small coefficients such that $\bar{c}U = A \cdot \bar{S}$. In a sense, this implies that for some $\bar{c}$, the ciphertext $\bar{c}U$ is valid in that it can be decrypted. Indeed, if $\bar{S}$ has small-enough coefficients, then there is a unique decryption of the ciphertext $\bar{c}U = A \cdot \bar{S}$. The idea, then, is to search through all possible $\bar{c}$ until we find the right one. There are two obstacles to this. First, the space of $\bar{c}$ may be quite large. Second, one must be able to detect the $\bar{c}$ that leads to the "correct" decryption $\bar{S}$ and this decryption must be unique.

First note that the space of $\bar{c}$ could be on the order of squared the space of c because $\bar{c} = (c - c')$. But because the decryptor also has access to the proof of knowledge, he already has c. We show that it is indeed enough to only go over the challenge space to find a c'. But even if the decryption algorithm needs to search the whole challenge space, it may still be too large if the soundness error is to be $2^{-128}$. To handle this, we take a smaller challenge domain (we will use $2^{45}$) and repeat the proof of knowledge three times in parallel to achieve soundness error of less than $2^{-128}$. This way, the decryption algorithm would only need to search a space of size $3 \cdot 2^{45}$. Note that if the prover is honest, then U itself can be decrypted (or one could also say that any $\bar{c}$ leads to a valid ciphertext $\bar{c}U$). Thus an honestly-formed ciphertext can be decrypted quickly, whereas a dishonestly formed one would take (at most) $3 \cdot 2^{45}$ attempts to decrypt. Since this is not outside the capabilities of an opener, there is no incentive for a prover to produce dishonest ciphertexts, because he will be detected as acting dishonestly and the ciphertext will still be opened.

The key to making the above decryption approach work is showing that: there is a way to detect whether or not a particular decryption is valid; and every valid decryption decrypts to the same value. By setting the parameters of the Ring-LWE cryptosystem below in a particular way, there is an algorithm that for every $\bar{c}$, either returns "fail", or returns the same output which is exactly the output that one could extract from the NIZK PoK. If U were validly formed, then this output is indeed the original plaintext m. If U is invalidly formed, yet the prover can still give a proof of knowledge as to the existence of an $\overline{S}$ with small coefficients such that $\bar{c}U = A \cdot \overline{S}$, then the decryptor will recover the same unique value that can be extracted from the proof of knowledge—and this can be thought of as the plaintext of U (or when dealing with group signatures, this is the identity of the signer). If the prover were acting honestly, then the extraction procedure would obtain $\overline{S}$, $\bar{c}$ such that $\bar{c}U = A \cdot \overline{S}$, and $\overline{S}/\bar{c} = S$. So, if we write $\overline{S} = [\bar{r}|\bar{e}_1|\bar{e}_2|\bar{m}]$, then $m = \bar{m}/\bar{c}$. Even if the prover were acting dishonestly, but still able to provide a proof of knowledge of an $\overline{S}$, $\bar{c}$ such that $\bar{c}U = A \cdot S$, then using the decryption key, the decryptor can test whether a $\bar{c}$ was valid (there could be multiple valid ones) and recover $\bar{m}$. The value of $\bar{m}/\bar{c} = m$ would then be the same for every valid $\bar{c}$.

The Group Signature

The high-level intuition for our scheme is the following. The group manager's public key will be [A|B], u and the signing key of a user with identity m will be an S with small coefficients such that $[A|B+mG] \cdot S = u$, where G is a "gadget vector" of the form $[1\lceil q^{1/k}\rceil | \ldots | \lceil q^{(k-1)/k}\rceil]$. (Such an S can be obtained using standard lattice sampling algorithms [GPV08, MP12] when the group manager possesses an appropriate trapdoor). To sign a message μ, the user would like to do a signature as in [Lyu12] using S as the secret key, which is at the same time a NIZK PoK of an $\overline{S}$ and $\bar{c}$ such that $[A|B+mG] \cdot \overline{S} = \bar{c}u$. This is not possible to do without revealing m because verification would require [A|B+mG]. Our solution is for the signer to randomly pick a vector E and an element d with small coefficients, and compute $H = (U+mG+\bar{c})/d$. By the Ring-LWE assumption, H is indistinguishable from uniform and hides the identity of the user. The signer then has a vector S' with small coefficients such that $[A|H|1]S' = u$. The signer will use the NIZK PoK from [Lyu12] to prove the knowledge of an $\overline{S}'$ and a $\bar{c}$ such that $$[A|H|1] \cdot \overline{S}' = \bar{c}u, \quad (2)$$

He will also need to prove that H is validly formed. The signer knows small-coefficient d, m, E such that $dH - mG - E = B$, and so he can again use [Lyu12] to prove the knowledge of a $\bar{d}$, $\bar{m}$, $\overline{E}$, $\bar{c}'$ such that $$\bar{d}H - \bar{m}G - \overline{E} = \bar{c}'B. \quad (3)$$

In addition, the signer must encrypt m and prove knowledge of the decryption of the ciphertext. For this, we employ our new encryption scheme with a proof of plaintext knowledge. The signer encrypts m as in (1) and then proves knowledge of $\bar{r}$, $\bar{e}_2$, $\bar{m}$, $\bar{c}'$ such that:

$$p(\bar{t}\bar{r} + \bar{e}_2) + \bar{m} = \bar{c}'w. \quad (4)$$

in the same proof as the proof of (3). Note that the w part of the ciphertext in (1) can be thought of as a commitment to m. This helps to link the message that can be decrypted from the ciphertext by the opener (i.e. $\bar{m}/\bar{c}'$) to the user identity that can be extracted from the proof of knowledge (also $\bar{m}/\bar{c}'$). By the properties of our encryption scheme, the ciphertext in (1), even if invalidly formed, can be decrypted in time proportional to the domain size of c'. Unfortunately, if we are to have negligible soundness error (say $2^{-128}$), then the domain of the challenges would have to be of size $2^{128}$ and so decryption (and thus opening) would not be possible.

To allow the opener to decrypt, the signer produces a proof of plaintext knowledge as described earlier, proving knowledge of $\bar{r}^i$, $\bar{e}_1^i$, $\bar{e}_2^i$, $\bar{c}^i$ for i=1, 2, 3 such that:

$$\begin{bmatrix} pa|p|0|0 \\ pt|0|p|1 \end{bmatrix} \begin{bmatrix} \bar{r}^i \\ \bar{e}_1^i \\ \bar{e}_2^i \\ \bar{m}^i \end{bmatrix} = \bar{c}^i \begin{bmatrix} v \\ w \end{bmatrix} \quad (5)$$

Because this proof is repeated three times, the challenge domain can be relatively small (of size $\approx 2^{45}$), and so the decryption can now be performed in approximately that time even if the signer is dishonest. By the properties of our encryption scheme, the value obtained by the opener (i.e. $\bar{m}^i/\bar{c}^i$ for some i) will be unique and because w is a commitment to m, it is also equal to $\bar{m}/\bar{c}'$ from (4). Hence the opener will obtain the same identity as can be extracted from the proof of knowledge.

For security, we need to prove that the group members remain anonymous when signing (anonymity), and that every valid signature opens to some identity that is under control of the adversary (traceability). The anonymity property stems from the CPA security of Ring-LWE and the indistinguishability of H from uniform. Proving the traceability property uses the approach of [ABB10]. The idea is for the simulator to guess the m*/c* that will be the identity on which the adversary will forge. Depending on how the message space is chosen, the security proof may end up being vacuous. Our resolution of this requires two observations. The first is that the ring R has subrings isomorphic to $\mathbb{Z}_q[x]/(x^{n/i}+1)$ for all i/n. These subrings consist of elements $a_0 + a_1 x^i + a_2 x^{2i} + \ldots + a_{n/(i-1)} x^{n-i}$ for $a_j \in \mathbb{Z}_q$. The second is that if one chooses the challenges from some subring of R, in the NIZK PoK from [Lyu12], then one can obtain a proof of knowledge that some part of S (where $A \cdot S = u$) is also in the subring. This is because all operations in the proof of knowledge that concern that individual component can consist of elements from the subring, and thus stay in the subring. To take advantage of these observations, we put all user identities m into the subring $R^{(16)} = \{a_0 + a_1 x^{n/16} + a_2 x^{2n/16} + \ldots + a_{15} x^{15n/16}\}$ (with small coefficients). Then, when doing the proof of (5), the challenges also come from the subring $R^{(16)}$. Thus the result $\bar{m}^i/\bar{c}^i$ is also in the subring. So when making a guess for the identity on which the adversary will forge, we need to guess m* and c* that come from relatively small (compared to $2^n$) subsets. In particular, the size of the domain of $\bar{m}^i$ is $k^{16}$ for a constant k, and we need even fewer guesses (around $2^{45}$) to guess $\bar{c}^i$.

The Ring $Z_q[x]/(x^n+1)$

We work here with the ring $R = \mathbb{Z}_q[x]/(x^n+1)$ where n is a power of 2 integer and q is some prime congruent to 5 mod 8. The elements of this ring are polynomials of degree at most n−1 with coefficients between −(q−1)/2 and (q−1)/2. We will denote elements of $\mathbb{Z}_q$ by regular lower-case letters, elements of R by bold lower-case letters, and elements of $R^k$ or $R^{k \times l}$ as bold upper-case letters. If we have $\mathbf{A} \in R^{k \times l}$, $\mathbf{B} \in R^{k \times l}$ and $\mathbf{C} \in R^{k \times l'}$, then [A|C] denotes a horizontal concatenation of the two matrices—thus $[\mathbf{A}|\mathbf{C}] \in R^{k \times (l+l')}$. [A; B'] denotes a vertical concatenation, so $[\mathbf{A}; \mathbf{B}'] \in R^{(k+k') \times l}$.

When working with elements over R, we will generally omit the implicit mod q in the notation. In cases where one would also want to perform modular reduction by another integer (like in Ring-LWE encryption), we make them explicit. We define the $l_1$, $l_2$, and $l_\infty$ lengths of an element $a = \sum_{i=0}^{n-1} a_i x^i \in R$ as $$\|a\|_1 = \sum_{i=0}^{n-1} |a_i|, \|a\| = \sqrt{\sum_{i=0}^{n-1} a_i^2}, \text{ and } \|a\|_\infty = \max_i (|a_i|)$$

respectively. For k-dimensional vectors $A = [a_1| \ldots |a_k] \in R^k$, we write $$\|A\|_1 = \|a_1\|_1 + \ldots + \|a_k\|_1, \|A\| = \sqrt{\|a_1\|^2 + \ldots + \|a_k\|^2}, \text{ and}$$

$$\|A\|_\infty = \max_i \|a_i\|_\infty.$$

We will denote by $R_i$ (or $R_i^k$) the set of elements of R (or $R^k$) whose $l_\infty$ length is at most i.

We define q to be a prime congruent to 5 mod 8 because for such primes, every polynomial with $l_\infty$ norm less than $\sqrt{q/2}$ is invertible in R. An additional useful property of the ring R is that it has subrings of size $q^i$ for every i/n that are isomorphic to rings $\mathbb{Z}_q[x]/(x^i+1)$. Here we work with a subring of size $q^{16}$ and we denote it by $R^{(16)}$. This subring consists of elements $a_0 + a_1 x^{n/16} a_2 x^{2n/16} + \ldots + a_{15} x^{15n/16}$ for $a_i \in \mathbb{Z}_q$.

Lattices and the Discrete Gaussian Distribution

A full-rank integer lattice $\Lambda$ of dimension n is an additive subgroup of $\mathbb{Z}^n$. This lattice is generated by some basis $B = [\mathbf{b}_1 | \ldots | \mathbf{b}_n] \in \mathbb{Z}^{n \times n}$. If a basis B is a generator for a lattice $\Lambda$, we will write $\mathcal{L}(B) = \Lambda$. The Gram-Schmidt orthogonalization of a matrix B is the matrix $\tilde{B} = [\tilde{\mathbf{b}}_1 | \ldots | \tilde{\mathbf{b}}_n] \in \mathbb{R}^{n \times n}$ where $$\tilde{b}_i = b_i - \sum_{j < i} \frac{b_i \cdot \tilde{b}_j}{\|\tilde{b}_j\|^2} \tilde{b}_j.$$

We will denote $\|\tilde{B}\|$ to be $$\max_i \|\tilde{b}_i\|$$

and for a lattice $\Lambda$, $$\tilde{\lambda}(\Lambda) = \min_{B, s.t. \mathcal{L}(B) = \Lambda} \|\tilde{B}\|.$$

For a matrix $\mathbf{A} \in \mathbb{Z}^{n \times m}$, we define $$\mathcal{L}^\perp(\mathbf{A}) = \{\mathbf{y} \in \mathcal{L}^{n \times m} : \mathbf{A}\mathbf{y} = 0 \bmod q\}. \quad (6)$$

$\mathcal{L}^\perp(\mathbf{A})$ is a full-rank lattice of dimension m. For a full-rank integer lattice $\Lambda$, we define the discrete Gaussian distribution $$D_{\Lambda, \mathbf{c}, \sigma}(\mathbf{v}) = e^{\frac{-\|\mathbf{v}-\mathbf{c}\|^2}{2\sigma^2}} / \sum_{\mathbf{w} \in \Lambda} e^{\frac{-\|\mathbf{w}-\mathbf{c}\|^2}{2\sigma^2}}$$

for any $\mathbf{v} \in \Lambda$, and 0 on all other points in space. If we have a basis B for $\Lambda$, then we can sample according to the above distribution for any standard deviation $\sigma > \|\tilde{B}\|$ ([GPV08, BLP+13]).

What we will often like to do is, given an integer matrix $\mathbf{A} \in \mathbb{Z}^{n \times m}$, and a target vector $\mathbf{u} \in \mathbb{Z}^n$, to sample a vector $\mathbf{s} \in \mathbb{Z}^m$ such that $\mathbf{A}\mathbf{s} = \mathbf{u} \bmod q$ and s is distributed according to some distribution that is independent of any "trapdoor" basis that we may know for $\mathcal{L}^\perp(\mathbf{A})$. We can do this by using a trapdoor basis B for $\mathcal{L}^\perp(\mathbf{A})$ as follows: first find an arbitrary integer vector r such that $\mathbf{A}\mathbf{r} = \mathbf{u} \bmod q$. Then sample a $\mathbf{v} \sim D_{\mathcal{L}^\perp(\mathbf{A}), -\mathbf{r}, \sigma}$ and set $\mathbf{s} = \mathbf{v} + \mathbf{r}$. Note that $\mathbf{A}\mathbf{s} = \mathbf{u} \bmod q$ (since $\mathbf{A}\mathbf{v} = 0 \bmod q$). Also $\mathbf{s} \sim D_{\mathbb{Z}^m, 0, \sigma}$ conditioned on $\mathbf{A}\mathbf{s} = \mathbf{u} \bmod q$. We define the distribution $D^\perp_{A, \mathbf{u}, \sigma}$ to be exactly the above distribution. We say that $\mathbf{s} \sim D^\perp_{A, \mathbf{u}, \sigma}$ if s is distributed according to $D_{\mathbb{Z}^m, 0, \sigma}$ conditioned on $\mathbf{A}\mathbf{s} = \mathbf{u} \bmod q$. Such an s can be generated using a basis B for $\mathcal{L}^\perp(\mathbf{A})$ for any $\sigma > \|\tilde{B}\|$ using the procedure above.

For a matrix $\mathbf{R} \in \mathbb{R}^{n \times m}$, we write $s_1(\mathbf{R})$ to denote the largest singular value of R, i.e., $$s_1(R) = \max_{u \in \mathbb{R}^m} \frac{\|Ru\|}{\|u\|}.$$

Polynomial Lattices and Sampling Over the Ring R

We work over the ring $R = \mathbb{Z}_q[x]/(x^n+1)$ with the usual addition and multiplication operations modulo q and $x^n+1$. Analogously to (6), for a vector $\mathbf{A} \in R^{1 \times m}$, a lattice $\mathcal{L}^\perp(\mathbf{A})$ can be defined as $$\mathcal{L}^\perp(A) = \{\mathbf{y} \in (\mathbb{Z}[x]/(x^n+1))^m : \mathbf{A}\mathbf{y} = 0 \bmod q\}.$$

If we want to generate a discrete Gaussian sample over $\mathbb{Z}[x]/(x^n+1)$, we can generate it over $\mathbb{Z}^n$ and then map into $\mathbb{Z}[x]/(x^n+1)$ using the straightforward embedding of coordinates into coefficients of the polynomials. We will slightly abuse notation and write $$y \xleftarrow{\$} D_{R, 0, \sigma}$$

to mean that y is generated according to $D_{\mathbb{Z}^n, \mathbf{c}, \sigma}$, and then interpreted as an element of R. Similarly, we write $$(y_1, \ldots, y_l) \xleftarrow{\$} D_{R^l, 0, \sigma}$$

to mean that z is generated according to $D_{\mathbb{Z}^{ln}, 0, \sigma}$ and then interpreted as l polynomials $y_i$. We will also be sampling from $D_{R^l \times R^{(16)}, 0, \sigma}$ which involves sampling a z from $D_{\mathbb{Z}^{nl+16}, 0, \sigma}$ and then writing it as l polynomials in R and one polynomial in $R^{(16)}$.

Singular Values.

For a matrix $\mathbf{R} \in \mathbb{R}^{n \times m}$, if all columns of R are independently generated according to the continuous Gaussian distribution with standard deviation $\sigma$ (or if every coefficient of R is chosen uniformly at random with maximum coefficient being $\sigma$), then $$s_1(R) \leq \sigma(\sqrt{m} + \sqrt{n} + t) \quad (7)$$

with probability greater than $1 - 2e^{-\pi t^2}$. The definition of maximum singular values when working over the ring R is exactly the same as when working over $\mathbb{R}$. If $\mathbf{R} \in R^{k \times m}$ then $$s_1(R) = \max_{u \in R^m} \frac{\|Ru\|}{\|u\|}.$$

We are interested in the discrete Gaussian distribution generated from distributions $D^\perp_{A,c,\sigma}$ where $A \in R^{1 \times m}$, and the uniform distribution over $R^{k \times m}$. In general, we have that if $R \in R^{k \times m}$ is such that each of its columns is chosen either from $D^\perp_{A,c,\sigma}$ where $A \in R^{1 \times k}$ and $\sigma > \tilde{\lambda}(\mathcal{L}^{-1}(A))$, or uniformly from $R_\sigma^k$, then with probability at least ½ we have $$s_1(R) \leq \sigma \cdot (\sqrt{kn} + \sqrt{mn}) \tag{8}$$

Ring-LWE Encryption Scheme

The secret keys are chosen as $s_1$, $$s_2 \xleftarrow{\$} R_1,$$

and the public keys are $$a \xleftarrow{\$} R$$

and $t = as_1 + s_2$. There is also a public parameter $p > 2$, which is a positive integer. To encrypt a message $m \in R_1$, the encryptor chooses $r$, $e_1$, $$e_2 \xleftarrow{\$} R_1$$

and outputs $(v, w)$ where $v \leftarrow p(ar + e_1)$ and $w \leftarrow p(tr + e_2) + m$. The decryption procedure computes $$w - vs_1 \bmod q \bmod p = p(rs_2 + e_2 - e_1 s_1) + m \bmod p = m$$

where the last equality holds in the case that $\|p(rs_2 + e_2 - e_1 s_1) + m\|_\infty < q/2$.

Proofs of Knowledge of Linear Relations

In [Lyu12], the signing algorithm is also an implicit proof of knowledge of the following: For a matrix $A \in R^{k \times l}$ and a vector $U \in R^k$ for which there exists an $S$ with $s_1(S) \leq S$ such that $AS = U$, it is possible to produce a proof of knowledge of $\bar{S}$, $\bar{c}$ such that $$A\bar{S} = U\bar{c} \text{ and } \|\bar{S}\| < 24 \cdot \sqrt{nl} \cdot S \cdot C, \text{ where } C = \max_{c \in C}\|c\|. \tag{9}$$

The soundness error of this proof will be $1/|C|$, where $C$ is the domain of "challenges". For convenience, we will put a bar over variables obtained as a result of extraction, and not put bars over variables used in the actual protocol. For this reason, the maximum norms of all extracted variables will be twice those used in the real protocol (see below for details). Similarly, we put bars over the "difference sets" and exclude 0. So e.g. $\bar{C} = (C - C) \setminus \{0\}$.

These proofs of knowledge play an important part in our protocols, so we will explain them in more detail. Suppose that the prover knows an $S \in R^l$ such that $AS = U$. The first step in the proof is to prepare a "masking" vector $Y \in R^l$ of some small length according to the discrete Gaussian distribution $D_{R^l, 0, \sigma}$ where $\sigma = 12 \cdot S \cdot C$. He then computes $W = AY$ and the challenge $c = H(W, U)$, where $H$ is a cryptographic hash function modeled as a random oracle that maps $\{0, 1\}^*$ to $C$.

For efficiency reasons, the range of $H$ should consist of polynomials with small norms. The prover then computes $Z = Sc + Y$. For the purpose of zero-knowledge, he needs to do rejection sampling that will make the distribution of $Z$ independent of $S$ (we do not concern ourselves with the particulars of this step—we just use the results of [Lyu12] as a black box). Note that because $S$, $c$ and $Y$ have small lengths, so does $Z$. The output of the prover is $(Z, c)$. The verifier accepts if $\|Z\| < 12 \cdot \sqrt{\ln} \cdot S \cdot C$ and $c = H(AZ - Uc, U)$.

By the forking lemma [PS00, BN06], one can extract another $Z'$, $c'$ such that $AZ' = Uc' + W$. Combining this equality with what was obtained in the first run implies that $A(Z - Z') = U(c - c')$. Note that, as $(c - c')^{-1}$ can have large coefficients, we cannot extract a "small" $S$ such that $AS = U$. If the prover does happen to be honest though, then $(Z - Z')/(c - c') = S$ for all distinct $c$, $c'$. We now make an important observation about the above proof. Suppose, as before, the prover has an $S$ such that $AS = U$, but also some polynomial of $S$ is in the subring $R^{(16)}$ of $R$. Then the proof can be adapted to prove this fact in addition to (9). The idea is to make the challenge space $C$ be a subset of $R^{(16)}$ and also choose the corresponding element of the "masking" vector $Y$ to be in this sub-ring. Then the output vector $Z = Sc + Y$ will be such that $Z_i$ will also have an element from the sub-ring $R^{(16)}$. The verifier will check this latter condition in addition to the usual checks. Also note that the proof system of [Lyu12] is clearly special sound: given two valid proof transcripts $(Y, c, Z)$ and $((Y, c'Z'))$, one can easily extract $\bar{S} = Z - Z'$ and $\bar{c} = c - c'$ satisfying (9).

Zero Knowledge and Transcript Simulation.

The above scheme from [Lyu12] is zero-knowledge due to the fact that the rejection sampling step makes the output $Z$ independent of $S$. More precisely, rejection sampling makes the distribution of $Z$ be within statistical distance of less than $2^{-110}$ of the distribution of $Y$ (so the shift $Sc$ is almost removed). Thus to produce a valid transcript, one samples $Z$ from the distribution of $Y$, then chooses a random $$c \xleftarrow{\$} C,$$

and computes $W = AZ - Uc$. The $c$ can then be programmed to be the output of $H(W, U)$.

The Fiat-Shamir Transformation and Digital Signatures.

The protocol for the proof of knowledge for linear relations can also be used as a digital signature scheme to sign a message $\mu$ ([Lyu12]). The modification to the protocol is that the message $\mu$ gets added to the input of the cryptographic hash function $H$ in both the signing and verification procedures.

Construction

Key generation and encryption are performed in the usual way as described above. Since a Ring-LWE ciphertext $[v; w]$ satisfies the linear relation $$\begin{bmatrix} v \\ w \end{bmatrix} = \begin{bmatrix} pa | p | 0 | 0 \\ pt | 0 | p | 1 \end{bmatrix} \begin{bmatrix} r \\ e_1 \\ e_2 \\ m \end{bmatrix}, \tag{10}$$

we can use the proof of (9) to prove the knowledge of the existence of a $\bar{c}$, $\bar{S} = [\bar{r}; \bar{e}_1; \bar{e}_2; \bar{m}]$ such that $$\bar{c}\begin{bmatrix} v \\ w \end{bmatrix} = \begin{bmatrix} pa \mid p \mid 0 \mid 0 \\ pt \mid 0 \mid p \mid 1 \end{bmatrix} \bar{S} \quad (11)$$

The $l_2$ norm of $\bar{S}$ is a direct function of the norm of S (and the challenges c) as given by (9). By the special soundness, the extractor must be able to recover the same message that decryption would have produced. A ciphertext v, w satisfying (11) may not be decryptable, because $\bar{S}/\bar{c}$ may not be small, but the ciphertext $[v; w]\bar{c}$ is decryptable. We can therefore think of $[v; w]\bar{c}$ as a ciphertext encrypting $\bar{m}$, which can be recovered by the decryptor using the Ring-LWE secret key.

Two obstacles still remain. First, decryption must be unique. What if there exist $\bar{c} \neq \bar{c}'$ so that both $[v; w]\bar{c}$ and $[v; w]\bar{c}'$ decrypt correctly to different messages $\bar{m}$ and $\bar{m}'$? This can happen, but it's not a problem because $\bar{m}$ is not the true plaintext. As alluded to above, if the prover is honest, then for every $\bar{c}$ we will have that $m = \bar{m}/\bar{c}$. With appropriately set parameters, then $\bar{m}/\bar{c} = \bar{m}'/\bar{c}'$ mod p (in the case of our group signature, we require a stronger relationship—we need $\bar{m}/\bar{c} = \bar{m}'/\bar{c}'$ in the ring, not just modulo p) for any pair $\bar{c}$, $\bar{c}'$, so the decryptor can use this value as the unique plaintext.

A second obstacle is that neither the ciphertext nor the proof of knowledge reveal the value $\bar{c}$, as this can only be recovered by extraction. By constructing the proof as a parallel composition of smaller proofs with reasonably-sized challenge spaces, we can actually find this $\bar{c}$, by brute force. For an honest encryptor who encrypts the message m, any value of $\bar{c}$ has a corresponding small-length $\bar{S}$ that satisfies (11) and the value of $\bar{m}/\bar{c}$ mod p is always m. A dishonest encryptor may, however, output a $[v; w]$ that will not decrypt to anything meaningful. Still, if he can produce a proof of knowledge as in (11), then the decryptor is able to recover the unique value $\bar{m}/\bar{c}$ mod p associated with $[v; w]$ through exhaustive search over the challenge space. Thus $[v; w]$ is in some sense a ciphertext of $\bar{m}/\bar{c}$ mod p, as in the case of the honest prover.

The proving algorithm (see Algorithm 1 below) is a parallel composition of l instances of a proving algorithm with a relatively small challenge space C so that C can be exhaustively searched, but $C^l$ cannot.

---

Algorithm 1. Proof of plaintext knowledge P(pk, µ, ρ)

---

Input: pk = (a, t, p), µ = m ∈ $R^{(16)}$, ρ = (r, $e_1$, $e_2$). Integer M ≈ e which ensures the correctness of the rejection sampling procedure. Challenge domain C ∈ $R_3^{(16)}$.

Cryptographic hash function H:{0, 1}* → $C^l$. Standard deviation $\sigma > 12 \cdot s_1([r; e_1; e_2; m]) \cdot \max_{c \in C} \|c\|$.

1:    $v \leftarrow p(ar + e_1)$
2:    $w \leftarrow p(tr + e_2) + m$
3:    $S \leftarrow [r; e_1; e_2; m]$
4:    for i = 1 to l do
5:    $(y_r^i, y_{e_1}^i, y_{e_2}^i, y_m^i) \xleftarrow{\$} D_{R^3 \times R^{(16)}, 0, \sigma}$
6:    $Y^i \leftarrow [y_r^i; y_{e_1}^i; y_{e_2}^i; y_m^i]$
7:    $U^i \leftarrow \begin{bmatrix} pa \mid p \mid 0 \mid 0 \\ pt \mid 0 \mid p \mid 1 \end{bmatrix} Y^i$
8:    end for
9:    $(c^1, \ldots, c^l) \leftarrow H(pk, v, w, U^1, \ldots, U^l)$
10:   for i = 1 to l do
11:   $Z^i = Sc^i + Y^i$
12:   with probability $\frac{D_{R^3 \times R^{(16)}, 0, \sigma}(Z^i)}{M \cdot D_{R^3 \times R^{(16)}, Sc^i, \sigma}(Z^i)}$, continue, else goto 2
13:   if $\|Z^i\| > 1.05 \cdot \sigma \cdot \sqrt{3n+16}$ or $\|Z^i\|_\infty > 8 \cdot \sigma$, goto 2
14:   end for
15:   return $\Pi = (c^1, \ldots, c^l, Z^1, \ldots, Z^l)$

---

The verification algorithm (see Algorithm 2 below) considers a proof valid iff all parallel proofs are valid.

---

Algorithm 2. Verification of plaintext knowledge V(pk, t, Π)

---

Input: pk = (a, t, p), t = v, w, Π = ($c^1, \ldots, c^l, Z^1, \ldots, Z^l$). Cryptographic hash function H: {0,1}* → $C^l$. Positive real σ. The challenge domain C and standard deviation σ should be the same as in the proving algorithm (Algorithm 1).

1:    for 1 to l do
2:    Parse $Z^i = [z_r^i; z_{e_1}^i; z_{e_2}^i; z_m^i]$
3:    if $z_m^i \notin R^{(16)}$ or $\|Z^i\| > 1.05 \cdot \sigma \cdot \sqrt{2n+16}$ or $\|Z^i\|_\infty > 8 \cdot \sigma$ then
4:      return 0
5:    end if Algorithm 2. Verification of plaintext knowledge V(pk, t, Π)

6:
$$U^i \leftarrow \begin{bmatrix} pa|p|0|0 \\ pt|0|p|1 \end{bmatrix} Z^i - c^i \begin{bmatrix} v \\ w \end{bmatrix}$$

7:    end for
8:    if $H(pk, v, w, U^1, \ldots, U^l) \neq (c^1, \ldots, c^l)$ then
9:        return 0
10:   end if
11:   return 1

For decryption, first consider the partial decryption algorithm Dẽc in Algorithm 3 below that, on input of a secret key sk, a ciphertext t=[v; w] and two challenges $c^i$ and $c^{i\prime}$, either returns a message μ by decrypting [v; w]($c^i$, $c^{i\prime}$) or failure symbol ⊥. The isValid test performs additional checks on the norms of the decrypted message to ensure uniqueness; we will specify these checks below. The actual decryption algorithm Dec (Algorithm 4 below) uses Dẽc as a subroutine by, for each i=1 to l, exhaustively searching $c^{i\prime} \in C$ such that Dẽc (sk, v, w, $c^i$, $c^{i\prime}$) returns a valid message. Note that the worst-case running time of the decryption algorithm is $O(l \cdot |C|)$ in general, but is constant for honestly generated ciphertexts because decryption will work on the first attempt.

Algorithm 3. Partial decryption Dẽc (sk, t, $c^i$, $c^{i\prime}$)

Input: sk = $s_1$, t = v, w, $c^i = c^i$, $c^{i\prime} = c^{i\prime}$.
1:   $\bar{c} = c^i - c^{i\prime}$.
2:   if isValid ($s_1$, v, w, $\bar{c}$) then
3:      return m ← ((w − v$s_1$) $\bar{c}$ mod q mod p) / $\bar{c}$ mod p
4:   else
5:      return ⊥
6:   end if Algorithm 4. Decryption Dẽc (sk, t, Π)

Input: sk = $s_1$, t = v, w, Π = ($c^1, \ldots, c^l, Z^1, \ldots, Z^l$)
1: if V(pk, t, Π) = 1 then
2:   for i = 1 to l do
3:      for $c^{i\prime} \in C$ do
4:         m ← Dẽc (sk, t, $c^i$, $c^{i\prime}$)
5:         if m ≠ ⊥ then
6:            return m
7:         end if
8:      end for
9:   end for
10: end if
11: return ⊥

We now need to show that the decryption algorithm outputs the same value as the extraction algorithm. For this, we need the following lemma which shows that for appropriately set parameters of the scheme and if there exists a small enough $\bar{s}$ the decryption algorithm will return the unique value $\bar{m}/\bar{c}$ mod p as in the extraction procedure.

Lemma.

Let the secret and public keys be as above. If there exist $\bar{r}, \bar{e}_1, \bar{e}_2, \bar{m}, \bar{c}$, such that $$\begin{bmatrix} pa|p|0|0 \\ pt|0|p|1 \end{bmatrix} \begin{bmatrix} \bar{r} \\ \bar{e}_1 \\ \bar{e}_2 \\ \bar{m} \end{bmatrix} = \bar{c} \begin{bmatrix} v \\ w \end{bmatrix} \bmod q \text{ and}$$

$\|p(\bar{r}s_2 + \bar{e}_2 - \bar{e}_1 s_1) + \bar{m}\|_\infty < q/2C$ where $C = \max_{\bar{c} \in C} \|\bar{c}\|_1 = \max_{c,c' \in C} \|c - c'\|_1$, then 1. $\|(w − vs_1)\bar{c} \bmod q\|_\infty < q/2C$
2. For any $\bar{c}' \in \bar{C}$ for which $\|(w − vs_1)\bar{c}' \bmod q\|_\infty < q/2C$ $(w − vs_1)\bar{c}' \bmod q/\bar{c}' \bmod p = \bar{m}/\bar{c} \bmod p$.

The above lemma gives us the algorithm that we use to test whether the ciphertext is valid. If the scheme parameters satisfy the preconditions of this lemma, one can check ciphertext validity by $$isValid(s_1, v, w, \bar{c}) = \begin{cases} 1 & \text{if } \|(w − vs_1)\bar{c} \bmod q\|_\infty < q/2C \\ 0 & \text{otherwise} \end{cases}$$

where $C = \max_{\bar{c} \in C} \|\bar{c}\|_1$.

By enforcing this check in the Dẽc algorithm, we ensure that the condition of the second part of the above lemma is satisfied for decryption, so that m=(w−v$s_1$)$\bar{c}$ mod q/$\bar{c}'$ mod p is the same as what is returned by the extraction algorithm. This proves the special soundness of our scheme.

Decryption Over the Full Ring

Sometimes, as in the case of our group signature here, we need to be able to recover some value that is unique not just modulo p, but for any ring (in which $\bar{c}$ is invertible), and in particular for R itself. To accomplish this, one needs to enforce a stricter isValid test to establish a relationship between the length of the secret key and the length of $\bar{m}$. By checking:

$$isValid(s_1, v, w, \bar{c}) = \begin{cases} 1 & \text{if } \|(w − vs_1)\bar{c} \bmod q\|_\infty < \dfrac{q}{2C} \text{ and} \\ & \|(w − vs_1)\bar{c} \bmod q \bmod p\|_\infty < \dfrac{p}{2C} \\ 0 & \text{otherwise} \end{cases} \quad (16)$$

decryption always returns the same value $\bar{m}/\bar{c}$ over the integers rather than just mod p.

Group Signature Scheme

Our embodiment of the group signature scheme is given below.

Group Key Generation.

The ring $R=\mathbb{Z}_q[x]/(x^n+1)$ will be instantiated with $n=4096$ and $q\approx 2^{104}$ such that $q\equiv 5 \bmod 8$. The vector $A\in R^2$ will be $A=[a|1]$ where $a$ is uniformly-random in $R$. The gadget vector $G$ is set to $G=[1|2^{26}|2^{52}|2^{78}]\in R^{1\times 4}$. The matrix $R\in R^{2\times 4}$ is chosen uniformly at random from $R_1^{2\times 4}$, and so we can have $s_1(R)<\sqrt{2n}+\sqrt{4n}<3.5\sqrt{n}$ (see (8)). We are then able to sample from the distribution $D^{-1}_{[A|AR+G],c,\sigma}$ with standard deviation $\sigma\approx q^{1/4}\cdot s_1(R)<2^{26}\cdot 2^8=2^{34}$. This implies being able to sample from $D^{-1}_{[A|AR+G|U],c,\sigma}$ for any $U\in R^{1\times m}$ with the same $\sigma$.

The group public key $gpk=(P, u)$ consists of the matrix $P=[A|B=AR+G|U]\in R^{1\times 10}$, for a uniformly random $U\in R^{1\times 4}$, and a vector $u\in R$ that is generated by selecting $$R_2 \xleftarrow{\$} R_{q1/6}^{1\times 6}$$

and setting $u=[A|B]R_2$. The group manager's secret key $gsk=R$ is the matrix which lets him sample user signing keys from $D^{-1}_{[A|AR+G],u,\sigma}$ for $\sigma=2^{34}$.

User Key Generation.

A user's identity id will be a polynomial $m$ in $R_1^{(16)}$. Thus, the scheme supports group sizes of up to $2^{25}$. (We could allow $m$ to take coefficients between $-2$ and $2$ and then group sizes up to $2^{37}$ would be supported.) The user signing key $usk$ will consist of an element $S\in R^{10\times 1}\sim D^{-1}_{[A|B|U+mG],u,\sigma}$ for $\sigma=2^{34}$, which for convenience we will we will often split into $S=[S_1; S_2]$ for $S_1\in R^{6\times 1}$ and $S_2\in R^{4\times 1}$, such that $[A|B|U+mG]S=u$, or equivalently $[A|B]S_1+(U+mG)S_2=u$.

The $l_2$ norm of $S$ less than $1.05\sigma\cdot\sqrt{2n+2nm}<2^{42}$, the $l_\infty$ norm of $S$ is less than $2^{37}$, and by (8), $s_1(S_1)<\sigma\cdot(\sqrt{2n+mn}+\sqrt{n})<2^{42}$, and $s_1(S_2)<\sigma\cdot(\sqrt{mn}=\sqrt{n})<2^{42}$ with probability that is at least ½. So the group manager can try generating a few different secret key candidates until he finds one that satisfies those bounds.

Opening Key Generation.

The opening authority creates a Ring-LWE key pair as described above. Namely, he generates random $s_1, s_2, \in R_1$, and an $$a \xleftarrow{\$} R,$$

and creates the public key $opk=(a, t\leftarrow as_1+s_2,p)$, where $p$ is a prime of size approximately $2^{50}$. The opener's secret key $osk=s_1$.

Signing.

When a group member with identity $m$ wants to sign a message $\mu$ with user signing key $usk$ $S$, he needs to give a proof of knowledge (that incorporates in the "challenge") of $S$ that satisfies the equation $$[A|B|U+mG]S=u \qquad (22)$$

One cannot naively apply (9) because this would require revealing $[A|B|U+mG]$ and thus the user identity $m$. We overcome this by "masking" $U+mG$ as follows. The signing user randomly chooses a uniformly random polynomial $d\sim R_1$ and a vector $E=[e_1|e_2|e_3|e_4]$ where $e_i\sim R_1$. The user then computes the vector $$H=(U+mG+E)/d.$$

To allow for opening, the user also computes a Ring-LWE encryption of $m$ as $$\begin{bmatrix} v \\ w \end{bmatrix} = \begin{bmatrix} pa|p|0|0 \\ pt|p|0|1 \end{bmatrix} \begin{bmatrix} r \\ e_1 \\ e_2 \\ m \end{bmatrix} \qquad (23)$$

where $r$, $e_1$, $$e_2 \xleftarrow{\$} R_1$$

as well as a proof of plaintext knowledge $\Pi$ as in Algorithm 1. The group signature will contain $H, v, w, \Pi$, and a proof of knowledge that we describe below. By the way that $H$ was constructed, the group member now knows a low-norm vector $S'\in R^{11}$ such that $$[A|B|H|1]S'=u \qquad (24)$$

If we break up the secret key $S$ into $S_1$ and $S_2$ such that (22) can be rewritten as $[A|B]S_1+(U+mG)S_2=u$, then if we let $S'_1=S_1$, $S'_2=dS_2$ and $s'_3=ES_2$, then $$[A|B]S'_1+HS'_2+s'_3=[A|B]S_1+(U+mG+E)S_2-ES_2=u$$

The group member can now give a zero-knowledge proof as in (9) which will prove knowledge of a $\bar{c}$ and a low-norm $\bar{S}$ such that $$[A|B|H|1]\bar{S}=u\bar{c} \qquad (25)$$

This proof of knowledge is used as a signature of $\mu$ by feeding $\mu$ into the random oracle in the Fiat-Shamir proof. The signer also needs to prove that the $H$ and $v$ are constructed validly. For this, he can again give a proof of knowledge as in (9) that he knows small-norm $\bar{d}, \bar{m}, \bar{E}, \bar{r}, \bar{e}_2$, and $\bar{c}'$ such that $$\bar{d}H-\bar{m}G-\bar{E}=\bar{c}'U \qquad (26)$$

and $$p\bar{t}\bar{r}+p\bar{e}_2+\bar{m}=\bar{c}'w. \qquad (27)$$

We point out that even though $d$ is used in proving (25) and (26), it is not necessary to "link" the two proofs by proving that the same $d$ was used (an honest signer, though, will use the same $d$ in both proofs). Because there are no such links between (25) and (26), it is possible to prove them in two different proofs using different "challenges" $c$ and $c'$. On the other hand, it is important that the $\bar{m}$ in (26) and (27) is the same. Therefore these two equations need to be proven together using the same "challenge" $c'$. To be more specific, the user will prove the knowledge of $\bar{d}, \bar{m}, \bar{E}, \bar{r}, \bar{e}_2$, and $\bar{c}'$ that satisfy $$\begin{bmatrix} H^T|G^T|0|I|0 \\ 0|m|pt|0|p \end{bmatrix} \begin{bmatrix} \bar{d} \\ \bar{m} \\ \bar{r} \\ \bar{E}^T \\ \bar{e_2} \end{bmatrix} = \bar{c}' \begin{bmatrix} U^T \\ w \end{bmatrix}. \qquad (28)$$

where the superscript T denotes the transpose. Combining (25) with (28) gives a proof of knowledge of low-norm $\bar{d}, \bar{m}, \bar{E}, \bar{c}, \bar{c}'$ and $\bar{S}'$ such that $$\left[A|B|\frac{\bar{c}'U + \bar{m}G + \bar{E}}{\bar{d}}\middle|1\right]\bar{S}' = \bar{c}u. \quad (29)$$

and of small length $\bar{r}, \bar{e}_2, \bar{m}$ to that satisfy (27).

The proof of plaintext knowledge $\Pi$ is a $\Sigma$ protocol, repeated $l=3$ times in parallel, that proves knowledge of $\bar{r}^i$, $\bar{e}_1^i, \bar{e}_2^i, \bar{m}^i, \bar{c}^i$ for $i=1, 2, 3$ such that:

$$\begin{bmatrix} pa|p|0\,|\,0 \\ pt|0|p\,|\,1 \end{bmatrix}\begin{bmatrix} \bar{r}^i \\ \bar{e}_1^i \\ \bar{e}_2^i \\ \bar{m}^i \end{bmatrix} = \bar{c}^i \begin{bmatrix} v \\ w \end{bmatrix} \quad (30)$$

The decryption of $[v; w]$ always returns the same value $\bar{m}^i/\bar{c}^i$, and this is also the same as the value $\bar{m}/\bar{c}'$ that could be extracted from the proof of knowledge of (28).

Because we will need to guess the value of $\bar{m}/\bar{c}'$, or equivalently $\bar{m}^i$ and $\bar{c}^i$, we want $\bar{m}$ to be in the small subring $R^{(16)}$. For this we take the challenges from that subring as well. In order for the challenge space to be large enough, we will take the challenges such that their $l_\infty$ norm is at most 3 (i.e. they come from the set $R_3^{(16)}$). The signing algorithm is described in full detail in Algorithm 5 below.

---

Algorithm 5. The group signing algorithm GSign(usk, gpk, μ)

---

Input: usk = S, opk = (a, t, p), μ. Cryptographic hash function H: $\{0,1\}^* \to C$ is modeled as a random oracle. We use $C\,\{c \in R_1: \|c\|_1 \le 32\}$ and so $\|C\| > 2^{256}$ and $\max_{c \in C} \|c\| < 6$.

1:    $d \xleftarrow{\$} R_1$

2:    $E = [e_1 | e_2 | e_3 | e_4] \xleftarrow{\$} R_1^4$

3:    $H \leftarrow (U + mG + E)/d$
4:    $S_2' \leftarrow dS_2$
5:    $s_3' \leftarrow -ES_2$
6:    $S' \leftarrow [S_1; S_2'; s_3']$ 7:    $Y \xleftarrow{\$} D_{R^{11},0,\sigma}$ 8:    $c \leftarrow H(H, [A|B|H|1]Y, u, \mu)$
9:    $Z = S'c + Y$ 10:    with probability $\dfrac{D_{R^{11},0,\sigma}(Z)}{M \cdot D_{R^{11},S'c,\sigma}(Z)}$, continue, else goto 1

11:    if $\|Z\| > 1.05 \cdot \sqrt{11n} \cdot \sigma$ or $\|Z\|_\infty > 8 \cdot \sigma$, goto 1

12:    $r, e \xleftarrow{\$} R_1$

13:    $v \leftarrow p(ar + e_1)$
14:    $w \leftarrow p(tr + e_2) + m$
15:    $S'' \leftarrow [d; m; r; E^T; e_2]$ 16:    $Y' \xleftarrow{\$} D_{R^8,0,\sigma'}$ 17:    $c' \leftarrow H\left(H, \begin{bmatrix} H^T | G^T | 0 | I | 0 \\ 0 | m | pt | 0 | p \end{bmatrix} Y', U^T, w, c\right)$ 18:    $Z'' = S''c' + Y'$ 19:    with probability $\dfrac{D_{R^8,0,\sigma'}(Z')}{M \cdot D_{R^8,S'',c',\sigma'}(Z')}$, continue, else goto 12

20:    if $\|Z'\| > 1.05 \cdot \sqrt{8n} \cdot \sigma'$ or $\|Z'\|_\infty > 8 \cdot \sigma'$, goto 12
21:    $\Pi \leftarrow P((a, t, p), m, (r, e_1, e_2))$ as per Algorithm 1.
22:    return sig = $(H, v, w, \Pi, c, Z, c', Z')$ Verification.

The verification algorithm involves verifying the zero-knowledge proofs for Equations (25) and (28) as well as the proof of plaintext knowledge Π. Details are given in Algorithm 6 below.

---

Algorithm 6. The verification algorithm GVerify(gpk, opk, μ, sig)

---

Input: gpk = (P = [A|B = AR + G|U], u), opk = (a, t, p), μ, sig = (H, v, w, Π, c, Z, c', Z'), positive reals σ, σ' as in Algorithm 5.

1:   if $c \neq H(H, [A|B|H|1] \cdot Z - uc, \mu)$ or $\|Z\| > 1.05 \cdot \sqrt{11n} \cdot \sigma$ or $\|Z\|_\infty > 8 \cdot \sigma$, then
2:     return 0
3:   else if $c' \neq H\left(H, \begin{bmatrix} H^T | G^T | 0 | I | 0 \\ 0 | m | pt | 0 | p \end{bmatrix} Z' - c' \begin{bmatrix} U^T \\ w \end{bmatrix}, U^T, w, c\right)$ or $\|Z'\| > 1.05 \cdot \sqrt{8n} \cdot \sigma'$ or $\|Z'\|_\infty > 8 \cdot \sigma'$, then
4:     return 0
5:   else if V(opk, v, w, Π) = 0 as per Algorithm 2 then
6:     return 0
7:   end if
8:   return 1

---

Opening.

To open a group signature sig=(H, v, w, Π, c, Z, c', Z'), the opener uses his secret key osk=$s_1$ to decrypt the ciphertext (v, w) by running m←Dec (osk, v, w, Π) of Algorithm 4. More specifically, Dec will exhaustively search for a second challenge $c'^i \in C$ that satisfies the predicate isValid ($S_1$, v, w, $\bar{c}$) from (16), i.e.

$$\|(w - vs_1)\bar{c} \bmod q\|_\infty < \frac{q}{2C} \text{ and}$$

$$\|(w - vs_1)\bar{c} \bmod q \bmod p\|_\infty < \frac{p}{2C} \text{ where}$$

$$\bar{c} = c^i - c'^i \text{ and}$$

$$C = \max_{c,c' \in C} \|c - c'\|_1,$$

and return the message $$m = ((w - vs_1)\bar{c} \bmod q \bmod p)/\bar{c}.$$

The embodiment described above provides a practical and efficient lattice-based group signature scheme. With the concrete parameters given above, signatures are approximately 0.77 Megabytes long for a 128-bit security level, resulting in significantly smaller signatures than prior proposals (we estimate about two orders of magnitude smaller).

Numerous changes and modifications can of course be made to the embodiments described above. For example, alternative embodiments could be based on other encryption schemes, for instance NTRU encryption. Other functions γ for $\bar{c}^i = \gamma(c^i, c'^i)$ in the second proof $\Pi_2$ may envisaged by those skilled in the art. The second proof $\Pi_2$ could comprise a different number l of sub-proofs $\Pi_2^i$, i=1 to l. One could, for instance, repeat the protocol l=4 times if one wishes the opening procedure to take time closer to $4 \cdot 2^{32}$. Also, if one were to assume that the adversary is quantum (and could therefore search a space of $2^{256}$ in time $2^{128}$) but the opener is classical, then one could repeat the protocol l=6 times in parallel with challenge space≈$2^{256/6}$, thus keeping the opener's time at a maximum of $2^{256/6}$ decryption attempts. The proof of plaintext knowledge thus introduces an interesting trade-off between the number of parallel repetitions and the decryption time required if the signer/encryptor is dishonest. Yet because a dishonest signer/encryptor will be caught in a reasonable amount of time and his identity will still be revealed, he has no incentive to act dishonestly; and honestly-created ciphertexts can be decrypted very fast.

As will be apparent to those skilled in the art, embodiments can be instantiated using other parameters, and using different subrings and/or rings other than $R = \mathbb{Z}_q[x]/(x^n + 1)$. In general, embodiments may employ a subring, isomorphic to $\mathbb{Z}_q[x]/(g(x))$, of a ring $R = \mathbb{Z}_q[x]/(f(x))$, where f(x) and g(x) are polynomials of degree deg(f) and deg(g) respectively such that deg(f)>deg(g)>1.

Figure 7:
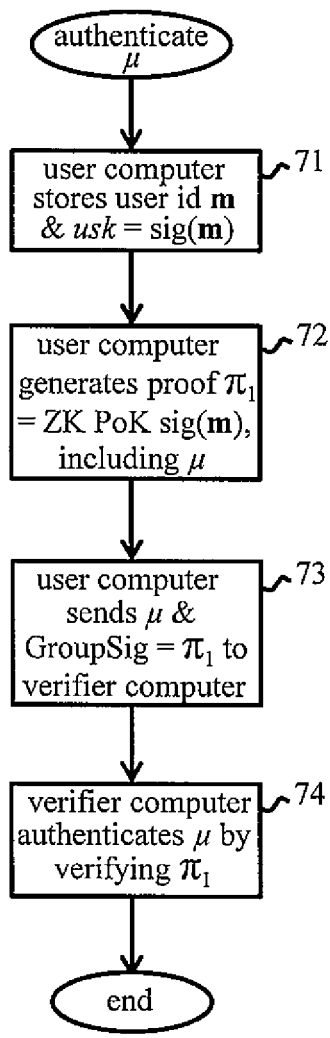
FIG. 7 indicates steps of another authentication method embodying the invention.

While the user id m is encrypted and a proof of plaintext knowledge of m is provided in the example above, these steps may not be required in other embodiments. FIG. 7 indicates steps of such an alternative embodiment. In step 71, the user computer 2 stores its user id m and user signing key usk as in step 30 of FIG. 3. As before, the user signing key usk comprises a signature "sig(m)" on the user id m under the group secret key gsk which is a secret key of a selectively-secure signature scheme. The group public key gpk is thus a public key of the selectively-secure signature scheme. The user id m is an element of a predetermined subring, isomorphic to $\mathbb{Z}_q[x]/(g(x))$, of a ring $R = \mathbb{Z}_q[x]/(f(x))$, where f(x) and g(x) are polynomials of degree deg(f) and deg(g) respectively such that deg(f)>deg(g)>1. For example, the ring $R = \mathbb{Z}_q[x]/(x^n + 1)$ may be used. In step 72, the user computer generates a first cryptographic proof $\Pi_1$. This proof $\Pi_1$ comprises a zero-knowledge proof of knowledge of the user signing key usk=sig(m), and includes the message μ in the proof of knowledge. In step 73, the user computer sends the message μ, and a group, signature comprising the first proof $\Pi_1$, to a verifier computer 4. The verifier computer can authenticate the message μ in step 74 by verifying the first proof $\Pi_1$ using the public key gpk of the selectively-secure signature scheme. The FIG. 7 process provides an anonymous signature scheme without the encryption procedure of the earlier embodiment, essentially providing a group signature scheme without the ability to open signatures.

While operation has been described for an exemplary computer system 1, various other computer systems can be envisaged. For example, user computers 2 may be embodied in other devices according to the application scenario. Such computers may, for example, be provided in vehicles for V2V applications, or may be embodied in a smart card or secure chip for eID or anonymous attestation applications, e.g. a TPM (trusted platform module) or SHM (secure hardware module). Numerous other applications in the IoT (Internet-of-Things) can be envisaged. A user computer may be embodied in a mobile phone, palmtop device, tablet computer, personal music player, etc., in other applications. Also, computers (such as the GM, verifier and opener computers 3, 5, 6 may be implemented by computing apparatus comprising one or more general- or special-purpose computing devices, each comprising one or more (real or virtual) machines, providing functionality for implementing the operations described. Such computing apparatus may be practiced in distributed cloud computing environments where tasks are performed by remote processing devices that are linked through a communications network.

Steps of flow diagrams may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

REFERENCES

[Lyu12] "Lattice signatures without trapdoors", Vadim Lyubashevsky, in EUROCRYPT, pages 738-755, 2012.
[ABB10] "Efficient lattice (H)IBE in the standard model", Agrawal et al., in EUROCRYPT, pages 553-572, 2010.
[Boy10] "Lattice mixing and vanishing trapdoors: A framework for fully secure short signatures and more", Xavier Boyen, in Public Key Cryptography, pages 499-517, 2010.
[NZZ15] "Simpler efficient group signatures from lattices", Nguyen et al., in PKC, pages 401-426, 2015.
[LLLS13] "Lattice-based group signatures with logarithmic signature size", Laguillaumie et al., in Sako and Sarkar, editors, Advances in Cryptology—ASIACRYPT 2013, volume 8270 of Lecture Notes in Computer Science, pages 41-61. Springer, 2013.
[LNW15] "Group signatures from lattices: Simpler, tighter, shorter, ring-based", Ling et al., in PKC, pages 427-449, 2015.
[LPR13a] "On ideal lattices and learning with errors over rings", Lyubashevsky, et al., J. ACM, 60(6):43, 2013. (Preliminary version appeared in EUROCRYPT 2010).
[LPR13b] "A toolkit for ring-lwe cryptography", Lyubashevsky, et al., in EUROCRYPT, pages 35-54, 2013.
[GPV08] "Trapdoors for hard lattices and new cryptographic constructions", Gentry et al., in STOC, pages 197-206, 2008.
[MP12] "Trapdoors for lattices: Simpler, tighter, faster, smaller", Micciancio, Peikert, in EUROCRYPT, pages 700-718, 2012.
[BLP+13] "Classical hardness of learning with errors", Brakerski et al., in Symposium on Theory of Computing Conference, STOC'13, Palo Alto, Calif., USA, Jun. 1-4, 2013, pages 575-584, 2013.
[PS00] "Security arguments for digital signatures and blind signatures", Pointcheval, Stern, J. Cryptology, 13(3):361-396, 2000.
[BN06] "Multi-signatures in the plain public-key model and a general forking lemma", Bellare, Neven, in ACM Conference on Computer and Communications Security, pages 390-399, 2006.

What is claimed is:

1. A method for improving efficiency of authenticating a message $\mu$, at a user computer of a group signature scheme, to a verifier computer, the method comprising: by the user computer:
   storing a user id m for the user computer and a user signing key which comprises a signature on the user id m under a secret key of a selectively-secure signature scheme,
   wherein the user id m is an element of a predetermined subring, isomorphic to $\mathbb{Z}_q[x]/(g(x))$, of a ring $R = \mathbb{Z}_q[x]/(f(x))$, where $f(x)$ and $g(x)$ are polynomials of degree $\deg(f)$ and $\deg(g)$ respectively where $\deg(f) > \deg(g) > 1$, where q is a predetermined prime number and where $\mathbb{Z}_q$ is the set of integers modulo q;
   encrypting the user id m via a predetermined encryption scheme to produce a ciphertext;
   selecting a set of masking components comprising elements of said ring R;
   generating a first cryptographic proof $\Pi_1$ comprising a zero-knowledge proof of knowledge of said user signing key and including the message $\mu$ in said proof of knowledge, wherein generating the first cryptographic proof $\Pi_1$ comprises using the masking components to hide the user id m in the first cryptographic proof $\Pi_1$; and
   sending the message $\mu$ and a group signature, comprising the first cryptographic proof $\Pi_1$, to the verifier computer,
   wherein the message $\mu$ is authenticated by the verifier computer by verifying the first cryptographic proof $\Pi_1$ using a public key of said selectively-secure signature scheme in response to receipt of the message $\mu$ and the group signature, and wherein the first cryptographic proof $\Pi_1$ further proves that the user id m in the user signing key is that encrypted in said ciphertext.

2. A method as claimed in claim 1 comprising:
   at the user computer:
   generating a second cryptographic proof $\Pi_2$ comprising a zero-knowledge proof of plaintext knowledge of the user id m encrypted in said ciphertext;
   wherein said group signature includes the second cryptographic proof $\Pi_2$.

3. A method as claimed in claim 1 wherein:
   said masking components comprise an element d of the ring R and a vector E of elements of the ring R;
   the user signing key comprises a vector S of elements of the ring R;
   the user computer generates a matrix $H = (U + mG + E)/d$ where U and G are components of a public key of said selectively-secure signature scheme; and
   the first cryptographic proof $\Pi_1$ proves knowledge of a vector $\bar{S}'$ dependent on the user signing key S, and an element $\bar{c}$, dependent on the message $\mu$, of the ring R where $[A|B|H|1]\bar{S}' = u\bar{c}$, where A, B and u are components of said public key.

4. A method as claimed in claim 3 comprising:
   at the user computer, selecting a first masking vector Y of elements of the ring R and generating a first challenge c as a function of H, [A|B|H|1], Y, u and $\mu$, wherein said element $\bar{c}$ is dependent on the first challenge c and wherein the first cryptographic proof $\Pi_1$ comprises said matrix H, said first challenge c and a vector $Z = S'c + Y$ where S' is a vector dependent on the user signing key S, said element d and said vector E.

5. A method as claimed in claim 4 wherein each of said user signing key S and said vector S' have polynomial coefficients of less than a predetermined magnitude.

6. A method as claimed in claim 5 wherein the first cryptographic proof $\Pi_1$ further proves that:
the vector H is validly constructed from said public key; and
said ciphertext is validly constructed for said encryption scheme.

7. A method as claimed in claim 6 wherein the first cryptographic proof $\Pi_1$ proves knowledge of said vector $\overline{S}'$, an element $\overline{m} = m\overline{c}'$ and respective elements $\overline{c}'$ and $\overline{d}'$ of the ring R, and a vector $\overline{E}$ of elements of the ring R where:

$$\left[ A | B | \frac{\overline{c}'U + \overline{m}G + \overline{E}}{\overline{d}} \middle| 1 \right] \overline{S}' = \overline{c}u.$$

8. A method as claimed in claim 7 wherein each of said vectors $\overline{S}'$ and $\overline{E}$, and said element $\overline{d}$ have polynomial coefficients of less than a predetermined magnitude.

9. A method as claimed in claim 7 comprising:
by the user computer:
selecting a second masking vector Y' of elements of the ring R and generating a second challenge c' as a function including H, Y' and said first challenge c, wherein said element $\overline{c}'$ is dependent on the second challenge c', and wherein the first cryptographic proof $\Pi_1$ further comprises the second challenge c' and a vector Z'=S"c'+Y' where S" is a vector dependent on the user id m, said element d, and said vector E.

10. A method as claimed in claim 9 wherein said encrypting of the user id m comprises selecting a set of random elements of the ring R and applying a linear function to the user id m and said set of random elements.

11. A method as claimed in claim 10 wherein said encryption scheme comprises a Ring-LWE encryption scheme, said set of random elements comprises elements r, $e_1$ and $e_2$, and wherein said ciphertext comprises a vector $$\begin{bmatrix} v \\ w \end{bmatrix}$$

where:

$$\begin{bmatrix} v \\ w \end{bmatrix} = \begin{bmatrix} pa | p | 0 | 0 \\ pt | 0 | p | 1 \end{bmatrix} \begin{bmatrix} r \\ e_1 \\ e_1 \\ m \end{bmatrix}$$

where a, t and p are public components of said encryption scheme.

12. A method as claimed in claim 11 wherein the first cryptographic proof ii further proves knowledge of elements $\overline{r}$ and $\overline{e}_2$ of the ring R where:

$$p t \overline{r} + p \overline{e}_2 + \overline{m} = \overline{c}' w.$$

13. A method as claimed in claim 12 wherein said ring R= $\mathbb{Z}_q[x]/(x^n+1)$ where n is a predetermined integer power of 2.

14. A method as claimed in claim 12 wherein:
said second cryptographic proof $\Pi_2$ comprises a plurality l of sub-proofs $\Pi_2^i$, i=1 to l, each comprising a zero-knowledge proof of plaintext knowledge of the user id m in the ciphertext; for each sub-proof $\Pi_2^i$, the user computer generates a challenge $c^i$, dependent on the ciphertext $$\begin{bmatrix} v \\ w \end{bmatrix},$$

for that sub-proof;
each sub-proof $\varnothing_2^i$ includes the challenge $c^i$ and proves knowledge of a vector $\overline{S}^{\Pi_2 i}$ and an element $\overline{c}^i$ where $$A^{\Pi_2} \overline{S}^{\Pi_2^i} = \overline{c}^i \begin{bmatrix} v \\ w \end{bmatrix},$$

in which $$A^{\Pi_2} = \begin{bmatrix} pa|p|0|0 \\ pt|0|p|1 \end{bmatrix}, \overline{c}^i = (c^i - c^{i'})$$

where $c^{i'}$ is an element of the ring R, and $$\frac{\overline{S}^{\Pi_2^i}}{\overline{c}^i} = S^{\Pi_2} \text{ where}$$

$$S^{\Pi_2} = \begin{bmatrix} r \\ e_1 \\ e_2 \\ m \end{bmatrix};$$

and
each challenge $c^i$ and each element $c^{i'}$ is constrained to a predetermined challenge space C permitting identification, by searching the challenge space C, of an element $c^{i''}$ where $$(c^i - c^{i''}) \begin{bmatrix} v \\ w \end{bmatrix}$$

decrypts to $m(c^i - c^{i''})$ using a decryption key of the encryption scheme, thereby revealing m.

15. A method as claimed in claim 14 including,
by user computer:
for each sub-proof $\Pi_2^i$, selecting a masking vector $Y^i$ of elements of the ring R; and
generating the challenge $c^i$ for each sub-proof $\Pi_2^i$ as a function of the ciphertext $$\begin{bmatrix} v \\ w \end{bmatrix},$$

a vector $U^i = A^{\Pi_2} Y^i$, and a public key of the encryption scheme;
wherein each sub-proof $\Pi_2^i$ comprises the challenge $c^i$ and a vector $Z^i = S^{\Pi_2} c^i + Y^i$ whereby said second proof $\Pi_2$ comprises $Z^i$ and $c^i$ for each sub-proof $\Pi_2^i$.

16. A method as claimed in claim 15 wherein the challenge $c^i$ for each sub-proof $\Pi_2^i$ is an element of said predetermined subring of the ring R.

17. A computer program product for improving efficiency of authenticating a message μ, at a user computer of a group signature scheme, to a verifier computer, said computer program product comprising a non-transitory computer readable storage medium having program instructions embodied therein, the program instructions being executable by the user computer to cause the user computer to:
- store a user id m for the user computer and a user signing key which comprises a signature on the user id m under a secret key of a selectively-secure signature scheme, wherein the user id m is an element of a predetermined subring, isomorphic to $\mathbb{Z}_q[x]/(g(x))$, of a ring $R=\mathbb{Z}_q[x]/(f(x))$, where $f(x)$ and $g(x)$ are polynomials of degree deg(f) and deg(g) respectively where deg(f)>deg(g)>1, where q is a predetermined prime number and where $\mathbb{Z}_q$ is the set of integers modulo q;
- encrypt the user id m via a predetermined encryption scheme to produce a ciphertext;
- select a set of masking components comprising elements of said ring R;
- generate a first cryptographic proof $\Pi_1$ comprising a zero-knowledge proof of knowledge of said user signing key and including the message μ in said proof of knowledge, wherein
- generating the first cryptographic proof $\Pi_1$ comprises using the masking components to hide the user id m in the first cryptographic proof $\Pi_1$; and
- send the message μ and a group signature, comprising the first cryptographic proof $\Pi_1$, to the verifier computer,
- wherein the message μ is authenticated by the verifier computer by verifying the first cryptographic proof $\Pi_1$ using a public key of said selectively-secure signature scheme in response to receipt of the message μ and the group signature, and wherein the first cryptographic proof $\Pi_1$ further proves that the user id m in the user signing key is that encrypted in said ciphertext.

18. A system for improving efficiency of authenticating a message μ, the system comprising: a user computer of a group signature scheme and a verifier computer, wherein the user computer is configured to:
- store a user id m for the user computer and a user signing key which comprises a signature on the user id m under a secret key of a selectively-secure signature scheme, wherein the user id m is an element of a predetermined subring, isomorphic to $\mathbb{Z}_q[x]/(g(x))$, of a ring $R=\mathbb{Z}_q[x]/(f(x))$, where $f(x)$ and $g(x)$ are polynomials of degree deg(f) and deg(g) respectively where deg(f)>deg(g)>1, where q is a predetermined prime number and where $\mathbb{Z}_q$ is the set of integers modulo q;
- encrypt the user id m via a predetermined encryption scheme to produce a ciphertext;
- select a set of masking components comprising elements of said ring R;
- generate a first cryptographic proof $\Pi_1$ comprising a zero-knowledge proof of knowledge of said user signing key and including the message μ in said proof of knowledge, wherein generation of the first cryptographic proof $\Pi_1$ comprises using the masking components to hide the user id m in the first cryptographic proof $\Pi_1$; and
- send the message μ and a group signature, comprising the first cryptographic proof $\Pi_1$, to the verifier computer;
- wherein the message μ is authenticated by the verifier computer, in response to receipt of the message μ and the group signature, by verifying the first cryptographic proof $\Pi_1$ using a public key of said selectively-secure signature scheme, and wherein the first cryptographic proof $\Pi_1$ further proves that the user id m in the user signing key is that encrypted in said ciphertext.

\* \* \* \* \*